(12) United States Patent
Zhang et al.

(10) Patent No.: US 11,029,812 B2
(45) Date of Patent: *Jun. 8, 2021

(54) APPARATUS CONTAINING COLOR CODED GROUP AND MEMBER ICONS AND METHOD OF GROUPING AND DEGROUPING MEMBERS ICONS IN LIGHTING APPLICATIONS

(71) Applicant: LEDVANCE LLC, Wilmington, MA (US)

(72) Inventors: Shiyong Zhang, Boxborough, MA (US); Scott Kelly, Manchester, NH (US)

(73) Assignee: LEDVANCE LLC, Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/515,193

(22) Filed: Jul. 18, 2019

(65) Prior Publication Data
US 2019/0339844 A1  Nov. 7, 2019

Related U.S. Application Data

(63) Continuation of application No. 15/640,477, filed on Jul. 1, 2017, now Pat. No. 10,409,451.

(51) Int. Cl.
| | | |
|---|---|---|
| *G06F 3/048* | (2013.01) | |
| *G06F 3/0481* | (2013.01) | |
| *G06F 3/0486* | (2013.01) | |
| *G06F 3/0488* | (2013.01) | |
| *G06F 3/0482* | (2013.01) | |
| *G06F 3/0484* | (2013.01) | |
| *H05B 47/19* | (2020.01) | |

(52) U.S. Cl.
CPC ........ *G06F 3/04817* (2013.01); *G06F 3/0482* (2013.01); *G06F 3/0486* (2013.01); *G06F 3/04845* (2013.01); *G06F 3/04883* (2013.01); *H05B 47/19* (2020.01)

(58) Field of Classification Search
CPC ... G06F 3/04817; G06F 3/0482; G06F 3/0486
See application file for complete search history.

(56) References Cited

U.S. PATENT DOCUMENTS

| | | | | |
|---|---|---|---|---|
| 7,343,046 B2* | 3/2008 | Curry | ................. | G06K 9/00456 382/162 |
| 8,264,455 B2* | 9/2012 | Fiebrink | ............... | G06F 3/0488 345/156 |

(Continued)

*Primary Examiner* — Scott T Baderman
*Assistant Examiner* — Mario M Velez-Lopez
(74) *Attorney, Agent, or Firm* — Tutunjian & Bitetto PC

(57) ABSTRACT

A method of controlling lighting that includes color coding at least one group icon for a scene for lighting on a light control interface. The at least one group icon can be color coded with a first type color coded identifier corresponding to the scene. The method can continue with grouping at least one member icon designating a light function form for at least one lamp to the at least one group icon on the light control interface. The at least one member icon may include a second type color identifier, in which a member icon being grouped to a group icon has a same color for the second type color identifier for the member icon as the first type color identifier for the group icon.

20 Claims, 13 Drawing Sheets

(56) References Cited

U.S. PATENT DOCUMENTS

| | | | | |
|---|---|---|---|---|
| 9,146,657 | B2* | 9/2015 | Beckett | G06F 3/0482 |
| 10,268,354 | B2* | 4/2019 | Kim | H05B 47/155 |
| 10,440,803 | B2* | 10/2019 | Kim | H05B 45/20 |
| 10,664,772 | B1* | 5/2020 | Poel | G06F 3/04817 |
| 2010/0277107 | A1* | 11/2010 | Baaijens | H05B 47/10 |
| | | | | 315/320 |
| 2011/0025519 | A1* | 2/2011 | Donaldson | H04L 67/125 |
| | | | | 340/664 |
| 2011/0164189 | A1* | 7/2011 | Asayama | G08C 17/00 |
| | | | | 348/734 |
| 2011/0178650 | A1* | 7/2011 | Picco | H05B 45/20 |
| | | | | 700/295 |
| 2013/0249433 | A1* | 9/2013 | Martello | H05B 47/175 |
| | | | | 315/292 |
| 2015/0008845 | A1* | 1/2015 | Kim | H05B 47/19 |
| | | | | 315/292 |
| 2016/0139750 | A1* | 5/2016 | Barrus | G06F 3/0483 |
| | | | | 715/777 |

\* cited by examiner

APPARATUS CONTAINING COLOR CODED GROUP AND MEMBER ICONS AND METHOD OF GROUPING AND DEGROUPING MEMBERS ICONS IN LIGHTING APPLICATIONS

TECHNICAL FIELD

The present Application for Patent claims priority to patent application Ser. No. 15/640,477 entitled "APPARATUS CONTAINING COLOR CODED GROUP AND MEMBER ICONS AND METHOD OF GROUPING AND DEGROUPING MEMBERS ICONS IN LIGHTING APPLICATIONS" filed Jul. 1, 2017, the entire contents of which are hereby expressly incorporated by reference herein.

BACKGROUND

Home and professional environments can contain many controllable lighting devices for creation of ambient, atmosphere, accent or task lighting. These controllable lighting devices are often connected and controlled via a network, which can be wired or wireless. These lighting devices can be controlled individually or in groups via a user interface of a lighting control.

SUMMARY

In one aspect, a method for controlling lighting is provided using color coded icons. In one embodiment, the method may include color coding at least one group icon for a scene for lighting on a light control interface. The at least one group icon being color coded with a first type color coded identifier corresponding to the scene. The method may continue with grouping at least one member icon designating a light function form for at least one lamp to the at least one group icon on the light control interface. The at least one member icon including a second type color identifier, wherein a member icon being grouped to a group icon has a same color for the second type color identifier for the member icon as the first type color identifier. In some embodiments, the method further includes activating the at least one lamp of the member icon being grouped to the group icon by selecting the group icon having the first color identifier matching the second color identifier of the member icon.

In another aspect of the present disclosure, a system for controlling lighting is provided. In one embodiment, the system for controlling lighting may include a color coder configured for color coding at least one group icon for a scene in response to a first user instruction entered into a light control interface, the at least one group icon being color coded with a first type color identifier corresponding to the scene. The system also includes a grouping module that is configured to group at least one member icon designating a light function form to the at least one group icon in response to a second user instruction entered into the light control interface. The at least one member icon having a second type color identifier. Member icon to group icon grouping is designated when the second type color identifier has a same color as the first type color identifier. The system can also include a lighting controller (also referred to as lighting activator) that is configured to activate lighting in response to a third user instruction entered into the light control interface, the third user instruction selecting at least one group icon. Each light function form of the member icons being grouped to the at least one group icon selected by the third user instruction is activated.

In another aspect of the present disclosure, a computer program product is provided for controlling lighting. In some embodiments, the computer program product may include a non-transitory computer readable storage medium including contents that are configured to cause a computer to perform a method for controlling lighting. The method may include color coding at least one group icon for a scene for lighting on a light control interface. The at least one group icon being color coded with a first type color coded identifier corresponding to the scene. The method may continue with grouping at least one member icon designating a light function form for at least one lamp to the at least one group icon on the light control interface. The at least one member icon including a second type color identifier. A member icon being grouped to a group icon has a same color for the second type color identifier for the member icon as the first type color identifier for the group icon. In some embodiments, the method further includes activating the at least one lamp of the member icon being grouped to the group icon by selecting the group icon having the first color identifier matching the second color identifier of the member icon.

BRIEF DESCRIPTION OF THE DRAWINGS

The following description will provide details of embodiments with reference to the following figures wherein.

DETAILED DESCRIPTION

Figure 1A:
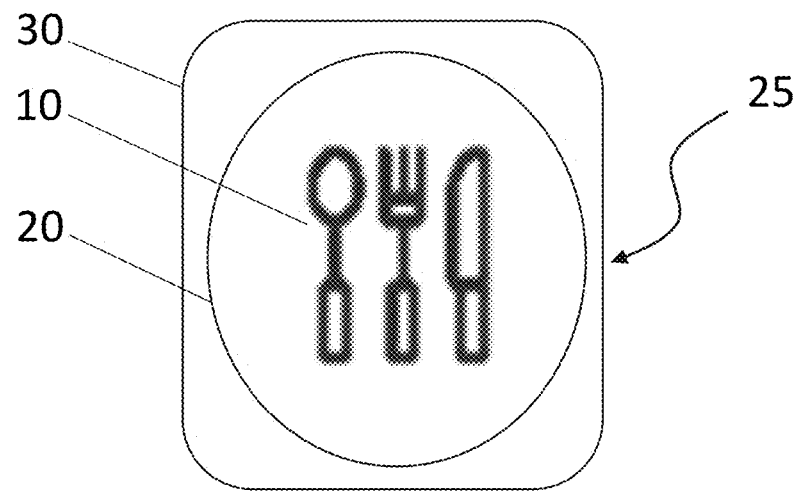
FIG. 1A is an illustration of a group icon corresponding to a scene for use with a graphic user interface (GUI) for controlling lamps, in accordance with one embodiment of the present disclosure.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Being able to control lights in groups is one aspect of effective lighting control. In some scenarios, multiple lamps may be wired to a control switch. But, it has been determined that as the electrical current rating of the wall mount is limited, the total number of lamps that can be wired to that switch is limited. Further, if dimming is a desired function of the lamps, the total number of lamps can be further limited by the in rush current limit of the dimmer switch. Additionally, lamps that are hard wired to a control switch can require rewiring to change a lamp from one group of common functioning lamps to another group of common functioning lamps. Although it is technically possible to wire lamps into different groups, such as in the case of staircase wiring, the actual wiring can be complicated.

Smart lighting controls can overcome these difficulties by using digital electronic control technologies. In smart lighting controls, grouping and regrouping of lamps can be accomplished easily when compared to lamps that are hard wired to switches. Methods for intuitive marking for each group of lighting, and uncomplicated ways to assign a member to one or more groups can enhance user interaction with the smart lighting controls. Typically, smart controls may employ character based labels, such as numbers, as icons to mark groups of lamps. It has been determined that the use of character labels, e.g., numbers, and icons, may not be an intuitive enough interface with a typical user, and the number of icons are limited. In instances in which the icon types are limited, the same icon may have to be used for more than one group, which can lead to confusion.

In some embodiments, the methods, systems and computer program products that are described herein add color coded peripherals to group icons and lamp icons (also referred to as member icons) employed in smart control interfaces. The term "peripheral" denotes a marker around at least a portion of a perimeter of a functional icon. In some examples, a color coded group icon may be provided by a function icon that is surrounded by a color coded peripheral. For example, a color coded lamp icon (also referred to as member icon) may include a lamp format icon that is surrounded by a color coded peripheral. The color coded peripheral can use a non-segmented color for designating grouping to a single group, and segmented colors for designating grouping to multiple groups.

In some embodiments, drag-drop pointing device gestures using a mouse, or other pointing device for a computer interface, can be used to make changes to a group of lamps, e.g., join groups and/or add a lamp to a group and/or subtract a lamp from a group. For example, to add a lamp to a group using drag-drop pointing device gestures, a user can drag-drop between a group icon and a lamp icon (which is interchangeably referred to as a member icon). In other embodiments, line-drawing using a touch screen interface may be used to make changes to a group of lamps, e.g., join groups and/or add a lamp to a group and/or subtract a lamp from a group. For example, to add a lamp to a group, a user can draw a line between a lamp icon (also referred to as a member icon) and a group icon. Following the drop drag operation or the line-drawing operation to add the lamp to the group, the lamp icon color peripheral is updated with the new color segment, thus illustrating that the group addition is completed. In some embodiments, the methods, systems and computer program products that are employed herein employ an apparatus employing a graphic user interface (GUI) that allows for adding and removing members from one or more groups using the color coded peripheral about a lamp function icon. In some embodiments, the lamps controlled by the apparatus using the aforementioned graphic user interface (GUI) can maintain digital addresses that can be utilized to group, regroup and control communications from the lamps to the apparatus employing the GUI. The methods, systems and computer program products that are provided herein are now describe with more detail with reference to FIGS. 1A-13.

Figure 1B:
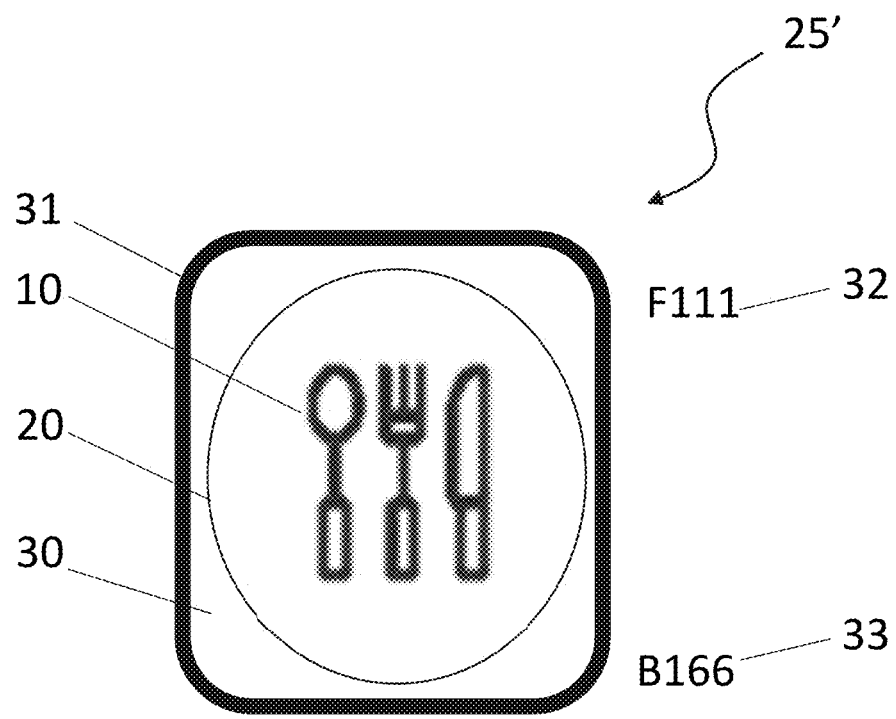
FIG. 1B is an illustration of a group icon corresponding to a scene for use with a graphic user interface (GUI) for controlling lamps including a skin indicator for large scale integration of controlling lamps on a multi-floor and/or multi-building level, in accordance with one embodiment of the present disclosure.

FIGS. 1A and 1B depict one embodiment of a group icon 25, 25' for use with a graphic user interface (GUI) for controlling lamps. In some embodiments, positioned substantially at a center of the group icon 25, 25' is the group function icon 10. The group function icon 10 denotes the type room in which the lighting is being controlled through the interface, e.g., graphic user interface. In some examples, the type of room may be referred to as a "scene". In some instances, the group function icons 10 correlate specific rooms and room types, e.g., bedroom, bathroom, etc., to which the lighting is to be energized, i.e., turned on, and/or de-energized, i.e., turned off. As will be discussed in further detail below, the methods, systems and computer program products described herein will also allow for dimming of lighting, brightening of lighting, as well as changing the color and other characteristics of the lighting. In the examples depicted in FIGS. 1A and 1B, the group function icon 10 indicates that group icon 25, 25' is linked to controlling a type of lighting, e.g., lamp, which is positioned within a kitchen/dining room.

Figure 2:
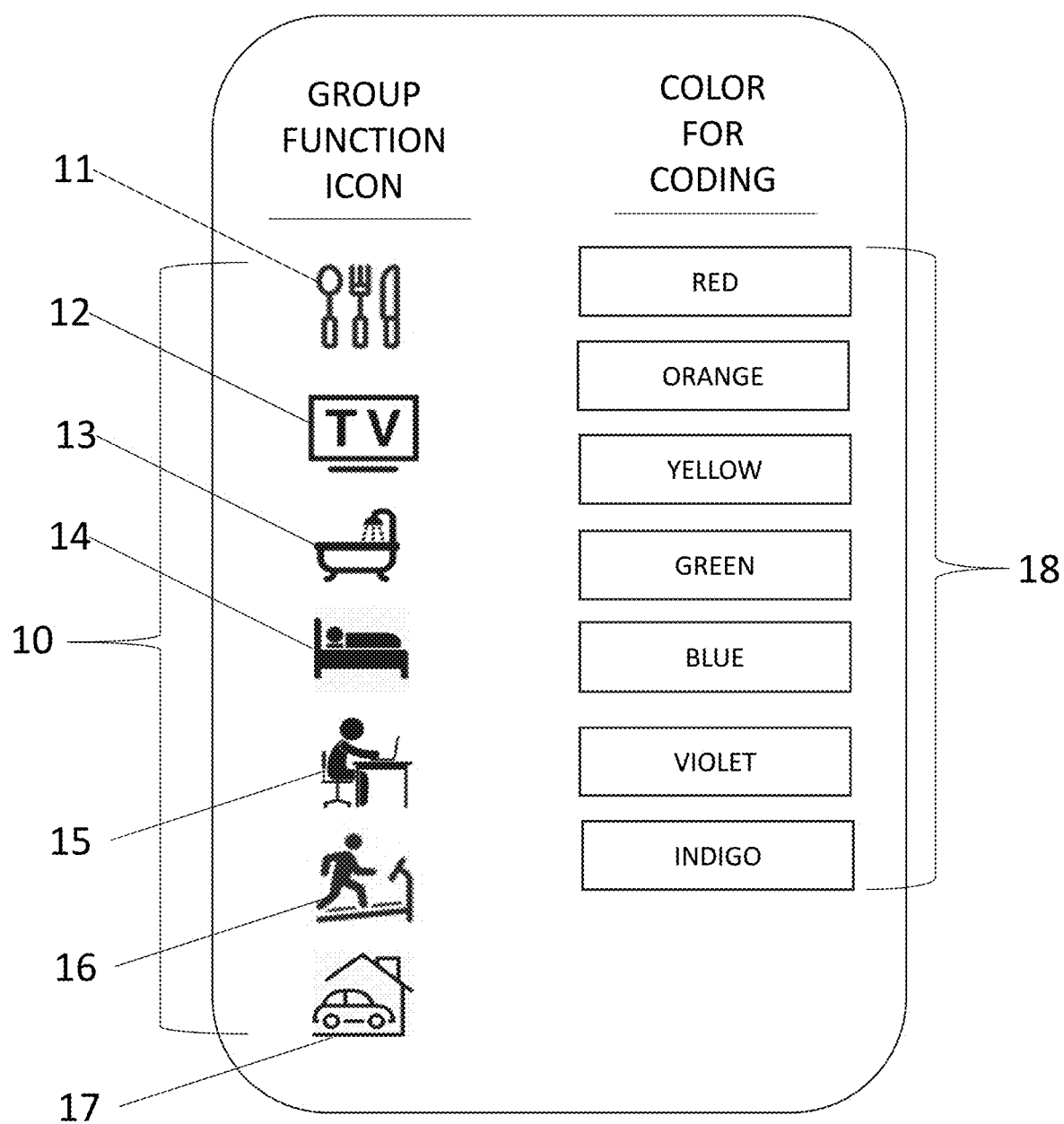
FIG. 2 is an illustration of a screen shot of a graphic user interface including a plurality of group function icons for color coding for use with the group icons that are depicted in FIGS. 1A and 1B.

FIG. 2 is an illustration of a screen shot of a graphic user interface including a plurality of group function icons 10 for use with the color coded group icons 25, 25' that are depicted in FIGS. 1A and 1B. For example, the icon for the group function icon 10 may be a kitchen/dining room icon 11 (which is also illustrated in FIGS. 1A and 1B), or the group function icon 10 may indicate that the lighting being controlled is in a television/theater room, as indicated by the television/theater icon 12. In yet other examples, a bathroom icon 13 indicates lighting to be controlled in a bathroom; a bedroom icon 14 indicates lighting to be controlled in a bedroom; an office icon 15 indicates lighting to be controlled in an office; an exercise icon 16 indicates lighting to be controlled in a gymnasium/exercise room; and a garage icon 17 indicates lighting to be controlled in a room for automotive storage, garage, exterior parking and/or automobile portico. Each of the aforementioned group function icon types may be collectively identified by reference number 10, i.e., a group function icon 10. It is noted that the group function icons 10 that are depicted in FIG. 2 are provided for illustrative purposes only, and are not intended to limit the present disclosure to only these types of icons.

The screen shot for the graphic user interface (GUI) depicted in FIG. 2 further includes a color for coding column/menu, which includes color icons 18 that can be employed to color code the group icons 25 including the group function icons 10.

Referring to FIGS. 1A and 1B, the icon background 20 for the function group icon 10 can designate a scene group, i.e., color effect, and/or control status for the group icon 25, 25'. The icon background 20 for the group function icon 10 can be a color effect for the lighting being employed in the groups. The term "color effect" denotes a type of light softness, light hue, light color or a combination thereof that is produced by a lamp. In some embodiments, the icon background 20 may be a solid color that is indicative of the color or hue of the light being produced by the lamps corresponding to the lights controlled by the group icon 25, 25'. In other embodiments, the icon background 20 may also be in the form of a pattern, shading and/or cross-hatching that is indicative of the color or hue of the light being produced by the lamps controlled by the group icon 25, 25'. Although not depicted in the supplied figures, the icon background 20 may display a graphic or image that can be indicative of the color or hue of the light being produced by the lamps controlled by the group icon 25, 25'.

In some embodiments, the icon background 20 for the group icon 25, 25' indicates whether the lights in the scene, i.e., room type, being depicted by the group function icon 10 are "on" or "off". For example, when the lights in the scene are "on", the icon background 20 may be colored, e.g., colored green or yellow. For example, when the lights in the scene are "off", the icon background is not colored, or colored to indicate an off state, e.g., the background 20 is black, white or grey. In some other embodiments, the icon background 20 for the group icon 25, 25' indicates a degree of dimming and/or illumination. For example, the icon background 20 may depict a degree of shading from black to increasingly lighter shades of gray to white in order to indicate increasing illumination from being off to the highest degree of illumination that can be provided by a lamp. In other embodiments, the icon background 20 may have cross-hatching to indicate a degree of dimming and/or illumination. For example, the icon background 20 may depict a degree of cross hatching density from no crosshatching to increasingly denser crosshatching to a solid color in order to indicate increasing illumination from being off to the highest degree of illumination that can be provided by a lamp.

Referring to FIGS. 1A and 1B, in some embodiments, the group icon 25, 25' is color coded to correspond to a specific group, i.e., a specific group function icon 10. As noted above, the group function icons 10 correlate specific rooms and room types, e.g., bedroom, bathroom, etc., to which the lighting is to be energized (activated), i.e., turned on, and/or de-energized, i.e., turned off, through the interface of control. By "color coded" it is meant that a single color is correlated to a single group. The term "color" denotes a phenomenon of light or visual perception that enables one to differentiate objects. Color may describe an aspect of the appearance of objects and light sources in terms of hue, brightness, and saturation. Some examples of colors that may be suitable for use with the color coding in accordance with the methods, systems and computer program products described herein can include red, orange, yellow, green, blue, indigo, violet and combinations thereof. It is noted that the aforementioned colors are provided for illustrative purposes only and are not intended to limit the present disclosure as any distinguishable color may be suitable for the methods, systems and computer program products described herein. One example of a screen shot for the graphic interface illustrating where a user may color code the group function icons 10 with a color selected from a list and/or menu of color icons 18 for providing the color coded group icons 25 is illustrated in FIG. 2.

Referring to FIGS. 1A and 1B, in one example, to designate the lighting in a kitchen, a color is selected, e.g., red, and the color is displayed around at least a portion of a periphery of the group function icon 10 that corresponds to the kitchen. To distinguish between multiple groups, i.e., multiple rooms of lighting, a different color can be selected for each room that is designated by a group function icon 10. In one embodiment, when a first color, such as red, is used to color code the group function icon 10 designating a kitchen/dining room (such as the kitchen/dining room icon 11 (which is also illustrated in FIGS. 1A, 1B and 2); and a second color that is different from the first color, such as blue, is used to color code the group function icon 10 designating a bathroom (such as the bathroom icon 13 depicted in FIG. 2). Any number of colors may be color coded to any number of group icons 25, 25' to provide separate colors for each room in which lighting is to be controlled.

Referring to FIGS. 1A and 1B, in some embodiments, the color used to color code the group icon 25, 25' is present at a point of the periphery of the group function icon 10. The color used to color code the group icon 25, 25' that is present at the periphery of the group function icon 10 may be referred to as a color coded peripheral 30. In some embodiments, the color coded peripheral 30 is present about an entirety of the periphery of the group function icon 10. For example, when the group function icon 10 has an arcular perimeter, e.g., circular perimeter, the color coded peripheral 30 is present encircling the entire perimeter of the group function icon 10. In some embodiments, the encircling peripheral shape of the color coded peripheral 30 may be circular, round, multi-sided, square, rectangular, regular polygon in shape, irregular polygon in shape or a combination thereof. In some embodiments, the color coded peripheral 30 does not encircle the entirety of the group function icon 10. In some examples, the color coded peripheral 30 can be present only atop the top surface of the group function icon 10 as a header; or the color coded peripheral 30 can be present only at a base of the group function icon 10 as a footer. In yet another example, the color coded peripheral 30 can be present only along a sidewall of the group function icon 10.

FIG. 1B is an illustration of a group icon 25' corresponding to a scene for use with a graphic user interface (GUI) for controlling lamps including a skin indicator 31 for large scale integration of controlling lamps on a multi-floor and/or multi-building level. The skin indicator 31 can be present about the entirety of the color coded peripheral 30, and can be a different color that the color coded peripheral 30. The skin indicator 31 can designate that the group icon 25' controls a scene on a specific floor of a building, a specific building in a grouping of buildings, and/or a grouping of buildings for a region of land, e.g., a grouping of buildings in an office park. In some embodiments, the group icon 25' may further include numerical indicators 32, 33 that may be used with the skin indicator 31 or substituted for the skin indicator 31. For example, the numerical indicator identified by reference number 32 may be "F111", which can be a designation for floor number 111. For example, the numerical indicator identified by reference number 33 may be "B166", which can be a designation for building number 166.

FIGS. 3A-3D depict of a member icons 50a, 50b, 50c, 50d for use with the graphic user interface (GUI) for controlling lighting. The member icons 50a, 50b, 50c, 50d include a member format icon 35. The member format icon 35 designates the type of lighting, e.g., type of lamp or light function form, that is being identified through the use of the member icons 50a, 50b, 50c, 50d on a graphic interface, e.g., graphic user interface (GUI). For example, the type of lamp being identified by the member format icon 35 may be hanging pendant light, as illustrated in FIGS. 3A-3D. The hanging pendant light that is identified by FIGS. 3A-3D illustrates only one light function form that can be depicted on the member format icon 35. Other examples of light function forms that can be designated using a member format icon 35 are illustrated in FIG. 4.

Figure 3A:
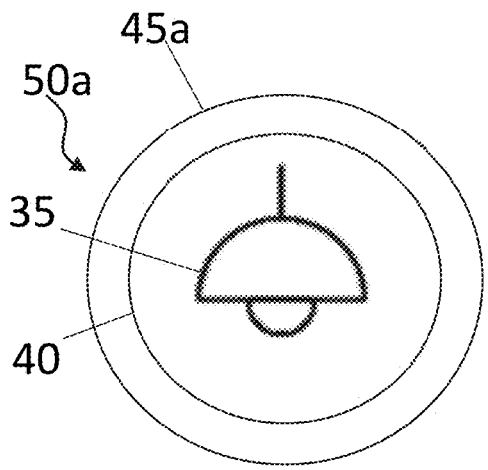
FIG. 3A is an illustration of a member icon for designating a light function form for use with the graphic user interface (GUI), the member icon having a single segment color coded peripheral for indicating grouping to a single group icon, in accordance with one embodiment of the present disclosure.
Figure 3D:
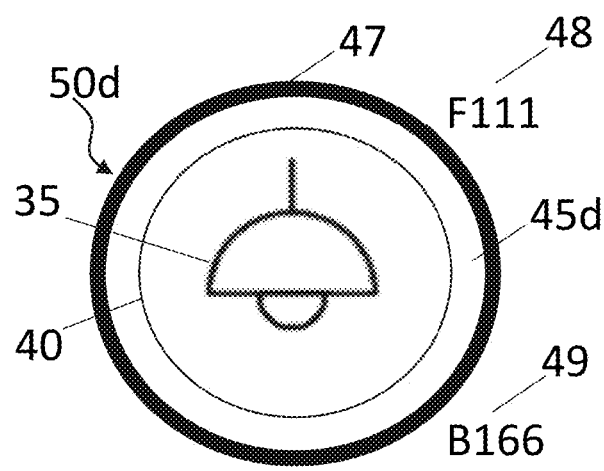
FIG. 3D is an illustration of a member icon for use with the graphic user interface (GUI) for controlling lamps including a skin indicator for large scale integration of controlling lamps on a multi-floor and/or multi-building level, in accordance with one embodiment of the present disclosure.
Figure 3B:
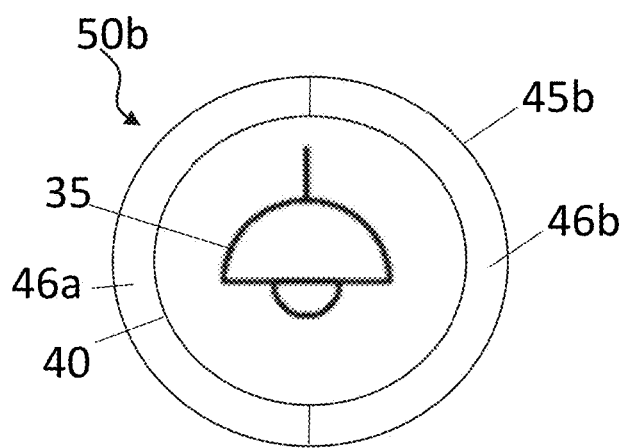
FIG. 3B is an illustration of a member icon for designating a light function form for use with the graphic user interface (GUI) for controlling lamps having a two-segment color coded peripheral for indicating grouping to two group icons, in accordance with one embodiment of the present disclosure.
Figure 3C:
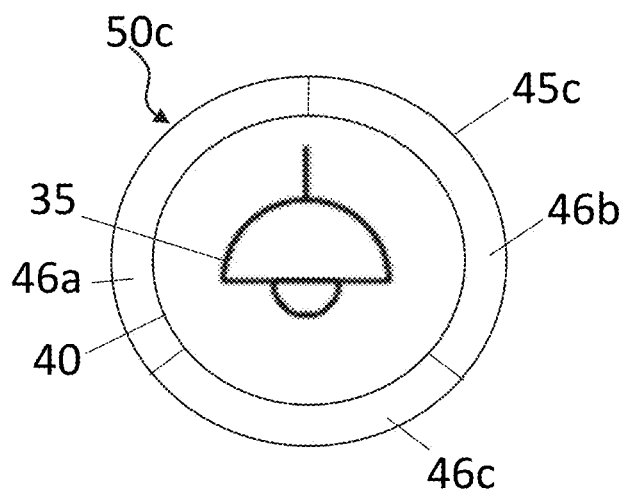
FIG. 3C is an illustration of a member icon for designating a light function form for use with the graphic user interface (GUI) for controlling lamps having a three-segment color coded peripheral for indicating grouping to three group icons, in accordance with one embodiment of the present disclosure.
Figure 4:
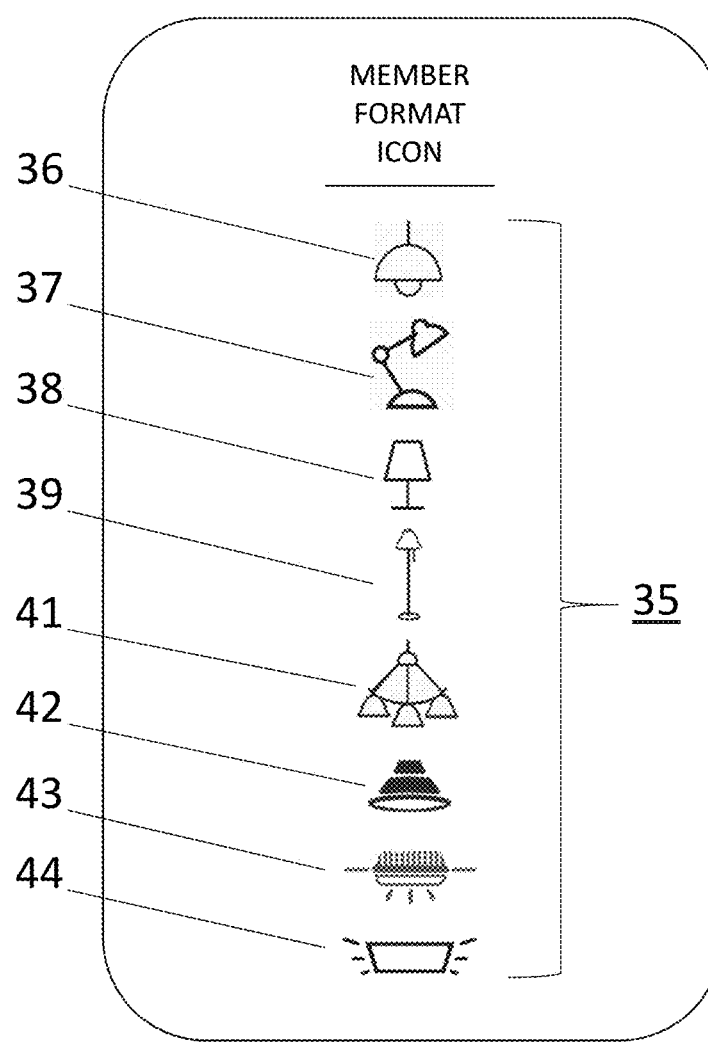
FIG. 4 is an illustration a plurality of member format icons for use with the member icons depicted in FIGS. 3A-3D.

FIG. 4 depicts a plurality of icons for use as member format icons 35 that can be used in member icons 50a, 50b, 50c, 50d. For example, the icon for the member format icon 35 may be a hanging pendant icon 36 (which is also illustrated in FIGS. 3A-3D). In another example, the member format icon 35 may indicate that the light function form can be a desk lamp, as illustrated by the desk lamp icon 37, or a table lamp, as illustrated by the table lamp icon 38. In yet other examples, a floor lamp icon 39 illustrates that the light function form is a floor lamp; a chandelier lamp icon 41 illustrates that the light function form is a chandelier; and a recessed can downlight icon 42 illustrates that the light function form is a recessed can downlight. Other icons can include a light source having a heat sink icon 43, and a 2×2 and/or 2×4 tube lighting office type fixture icon 44. Each of the aforementioned member format icon types may be collectively identified by reference number 35, i.e., member format icon 35. It is noted that the member format icons 35 that are depicted in FIG. 4 provide for illustrative purposes only, and are not intended to limit the present disclosure to only these types of icons.

In some embodiments, the member format icon 35 may designate a type of illumination bulb instead of designating light function forms. The type of illumination bulb being identified by the member format icon 35 may include light emitting diode (LED) type bulbs, incandescent type bulbs, halogen type bulbs, fluorescent type bulbs, compact fluorescent type bulb and combinations thereof.

Referring to FIGS. 3A-3D, the member icon 50a, 50b, 50c, 50d may further include an icon background 40 for the member format icon 35 that designates a scene group (lighting effect) and/or control status. The icon background 40 can be an on/off indicator for the light function form, i.e., lamp type, designated by the member format icon 35. The use of colors, shading and cross hatching for the icon background 40 can be used to indicate whether a lamp is "on" or "off", or to indicate a degree of diming or illumination. The icon background 40 of the member format icon 35 may also be used to indicate color effects, e.g., a type of light softness, light hue, light color or a combination thereof that is produced by a lamp designated by the member format icon 35.

Referring to FIGS. 3A-3D, a color coded peripheral 45a, 45b, 45c, 45d may be present on at least a portion of a periphery of the member format icon 35 of the member icon 50a, 50b, 50c, 50d. The color coded peripheral 45a, 45b, 45c, 45d designates how a member icon 50a, 50b, 50c, 50d is grouped to a group icon 25. More specifically, the color coded peripheral 45a, 45b, 45c, 45d illustrates how a type of lighting, i.e., type of light function form, e.g., pendant light, floor light, etc., is grouped to at least one scene, i.e., room type, e.g., dining room, bathroom, etc.

As described with reference to FIGS. 1A and 1B, the color coded peripheral 30 about the group function icon 10 of the group icon 25, 25' correlates a color, e.g., red, to a specific scene or room type, e.g., a dining room/kitchen. Referring to FIGS. 3A-3D, the color coded peripheral 45a, 45b, 45c, 45d of the member icon 50a, 50b, 50c, 50d designates when a lamp type designated by the member format icon 30 of the member icon 50a, 50b, 50c, 50d has been grouped to a group icon 25, 25'. Grouping is designated in the color coded peripheral 45a of the member icons 50a by displaying the same color, e.g., red, as the color, e.g., red, of the color coded peripheral 30 of the group icon 25 to which the member icon 50a has been grouped, as illustrated in FIGS. 1 and 3A. For example, when the color red designates the dining room/kitchen scene by the color coded peripheral 30 of the group icon 25, the same color red when used for the color coded peripheral 45a of the member icon 50a designates that the light function form of the member format icon 35 for the member icon 50a is grouped to the group icon 25. In this example, every pedestal lamp designated by the member icon 50a having a red coded periphery, i.e., color coded peripheral 45a, will be controlled, e.g., turned on and/or off, by a group icon 25 having a color coded peripheral 30 colored with the same color red, e.g., the group icon 25 designating a dining room/kitchen scene.

FIG. 3A illustrates a member icon 50a having a non-segmented color coded peripheral 45a, in which the color coded peripheral includes only one color. This illustrates that the lamps designated by the member format icon 35 of the member icon 50a are grouped to a single scene, e.g., room type, such as a kitchen, designated by the group function icon 10 of a group icon 25, in which the color coded peripheral 30 of the group icon 25 and the color coded peripheral 45a of the member icon 50a share a same color. For example, a user can control lighting in a dining room by selecting the group icon 25 having the group function icon 25 designating a dining room icon 11 (as depicted in FIG. 1A, in which the dining room icon 11 is depicted in FIG. 2). In this example, every lamp that is linked with a member icon 50a having a same color coded peripheral 45a as the color coded peripheral 30 of the group icon 25 designating light controls for the dining room is controlled through interactions, e.g., selecting the group icon 25 on the interface, with that group icon 25.

FIG. 3B illustrates one embodiment of a member icon 50b having a segmented color coded peripheral 45b. The segmented color coded peripheral 45b illustrates one example of how a member icon 50b can be grouped to more than one group icon 25. For example, the member icon 50b depicted in FIG. 3B includes two segments 46a, 46b for the color coded peripheral 45b, wherein each segment 46a, 46b has a different color that groups the lighting designated by the member icon 50b to group icons 25 having a color coded peripheral 30 with a color matching each segment 46a, 46b. For example, the first segment 46a of the color coded peripheral 45b of the member icon 50b depicted in FIG. 3B can be a red color that corresponds to the red color of the color coded peripheral 30 of the group icon 25 that designates a dining room scene for lighting. This is similar to the use of the red color for the color coded peripheral 45a of the member icon depicted in FIG. 3A, which as described above was grouped to the group icon 25 depicted in FIG. 1, which also has a same red color for its color coded peripheral 30.

In the example, depicted in FIG. 3B, the second segment 46b of the color coded peripheral 45b is a color that is different from the color of the first segment 46a of the color coded peripheral 45b. The second segment 46b is a color that designates that the light function form, i.e., lamp type, of the member icon 50b is grouped to a second scene. The second scene, or room type, that is grouped to the member icon 50b is controlled through a second group icon 25 (not shown) that includes a color coded peripheral 30 having a same color as the second segment 46b of the color coded peripheral 45b of the member group 50b. For example, a second group icon 25 (not shown) may have a color coded peripheral 30 that is blue, in which the second group function icon 10 designates a second scene, such as an office, e.g., having an office icon 11 (as depicted in FIG. 2). When the second segment 46b of the color coded peripheral 45b is the same color blue as the color coded peripheral 30 for the second group icon 25, the light function form designated by the member icon 50b is grouped to that scene designated by the second group icon 25. In this example, the pedestal light designated by the member icon 50b is linked to two different scenes, e.g., a kitchen and an office. A user of the interface selecting either one of these scenes, by selection of a first group icon 25 designating the kitchen (as depicted in FIG. 1A), or a second group icon designating an office (not shown) can control the light function form, e.g., pedestal light, being designated by the member icon 50b. In this example, the pedestal light of the member group 50b depicted in FIG. 3B is grouped to both scenes.

FIG. 3C depicts another example of a segmented color coded peripheral 45c that includes three segments, i.e., a first segment identified by reference number 46a, a second segment identified by reference number 46b and a third segment identified by reference number 46c, in which each segment can be a different color that is linked to a different scene designated by a different group icon 25. In this example, the first segment 46a may be a red color that is the same color as the red color for the color coded peripheral 30 of a group icon 25 corresponding to a dining room, as described with reference to FIG. 1A. The second segment 46b may be a different color as the first segment, e.g., being blue, that is the same color as the color for the color coded peripheral 30 of a second group icon 25 (not shown) corresponding to another room, such as an office, as described with reference to FIG. 3B. The third segment 46c may be a different color from the first segment 46a and the second segment 46b, and the third segment 46c may have the same color, e.g., green, that is used to code a color coded peripheral 30 of a third group icon 25 (not shown), in which the scene of the third group icon can be a garage or car storage area. In the example depicted in FIG. 3C, the light function form, i.e., pedestal light, designated by the member icon 50c having the three-segmented color coded peripheral is a member of three group icons 25 corresponding to three different scenes (also referred to as room types), e.g., a kitchen, office and garage.

FIG. 3D is an illustration of a member icon 50d for use with the graphic user interface (GUI) for controlling lamps including a skin indicator 47 for large scale integration of controlling lamps on a multi-floor and/or multi-building level. The skin indicator 47 can be present about the entirety of the color coded peripheral 45d, and can be a different color that the color coded peripheral 45d. The skin indicator 47 can designate that the member format icon 35 controls a light function form, i.e., lamp type, on a specific floor of a building, a specific building in a grouping of buildings, and/or a grouping of buildings for a region of land, e.g., a grouping of buildings in an office park. In some embodiments, the member icon 50d may further include numerical indicators 48, 49 that may be used with the skin indicator 47, or substituted for the skin indicator 47. For example, the numerical indicator identified by reference number 48 may be "F111", which can be a designation for floor number 111. For example, the numerical indicator identified by reference number 49 may be "B166", which can be a designation for building number 166.

It is noted that the number of segments for the color coded peripheral 45a, 45b, 45c, 45d depicted in FIGS. 3A-3D are only some examples of the present disclosure, and it is not intended that the present disclosure be limited to only these examples, For example, the number of segments for the color coded peripheral 45a, 45b, 45c, 45d for the member icons 50 may be equal 1, 2, 3, 5, 10 or 15, or any range for the number of segments having a lower limit and an upper limited selected from the aforementioned examples. Each of the aforementioned color coded peripheral 45a, 45b, 45c, 45d may be collectively referred to with reference number 45.

Referring to FIGS. 3A-3D, in some embodiments, the color used to color code the segments of the color coded peripheral 45a, 45b, 45c, 45d for the member icon 50a, 50b, 50c, 50d is present at a point of the periphery of the member format icon 35. In some embodiments, the color coded peripheral 45a, 45b, 45c, 45d is present about an entirety of the periphery of the member format icon 35. For example, when the member format icon 35 has an arcular perimeter, e.g., circular, the color coded peripheral 45a, 45b, 45c, 45d is present encircling the entire perimeter of the member format icon 35. In some embodiments, the encircling peripheral shape of the color coded peripheral 45a, 45b, 45c, 45d may be circular, round, multi-sided, square, rectangular, regular polygon in shape, irregular polygon in shape or a combination thereof. In some embodiments, the color coded peripheral 45a, 45b, 45c, 45d does not encircle the entirety of the member format icon 35. In some examples, the color coded peripheral 45a, 45b, 45c, 45d can be present only atop the top surface of the member format icon 35 as a header; or the color coded peripheral 45a, 45b, 45c, 45d can be present only at a base of the member format icon 35 as a footer. In yet another example, the color coded peripheral 45a, 45b, 45c, 45d can be present only along a sidewall of the member format icon 35.

It is noted that the member icons 50a, 50b, 50c, 50d depicted in FIGS. 3A-3D may be collectively identified by reference number 50.

Figure 5:
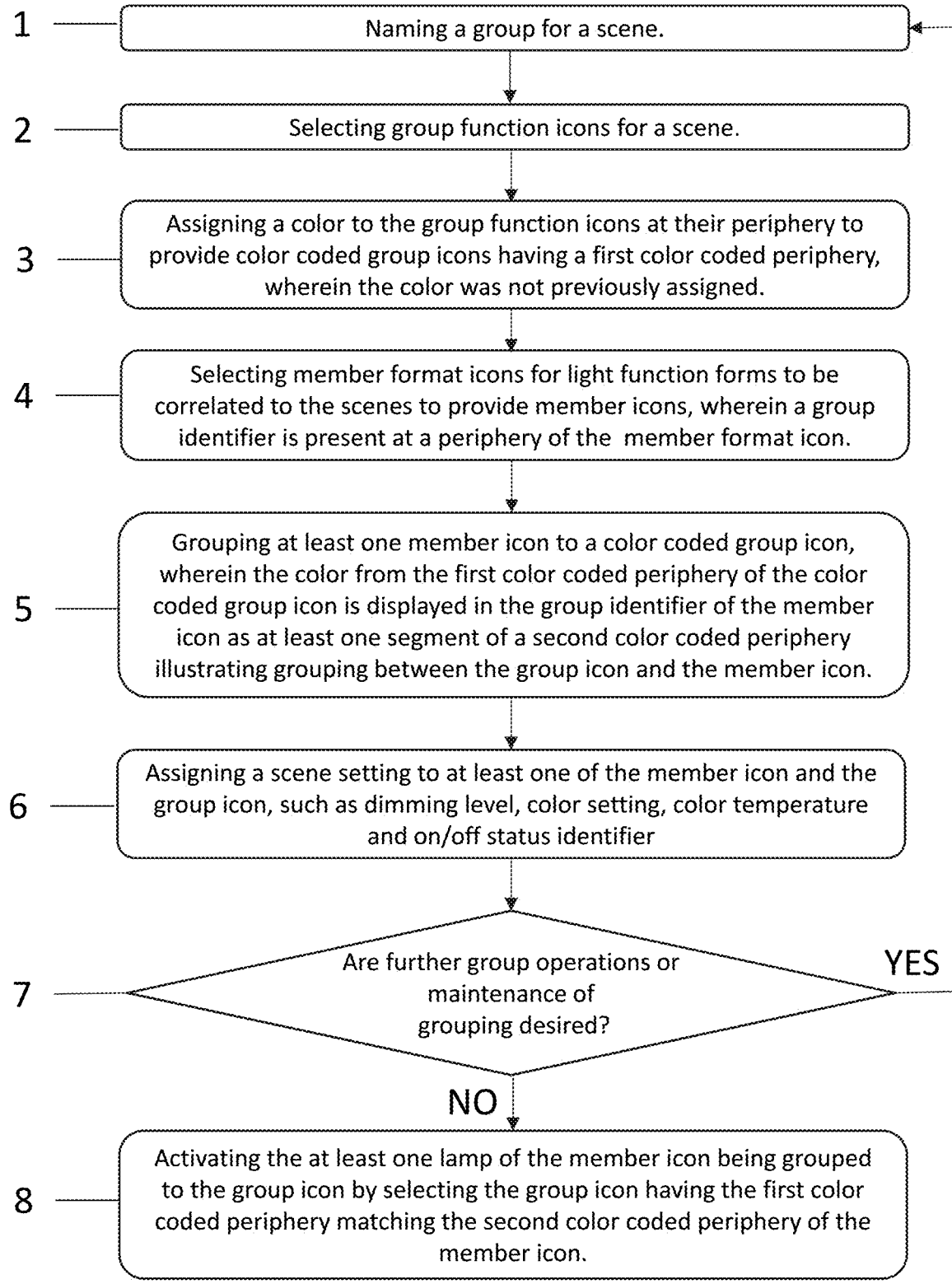
FIG. 5 is a flow diagram showing a method of grouping member icons designating light function forms, i.e., lamp types, to group icons designating scenes, i.e., rooms, in accordance with one embodiment of the present disclosure.

FIG. 5 is a flow diagram illustrating one embodiment of a method of grouping member icons 50 designating light function forms, i.e., lamp types, to group icons 25 designating scenes, i.e., room types. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One embodiment of a method of controlling lighting in accordance with the present disclosure may begin with step 1 of FIG. 5, which includes naming a group for a scene. This typically includes creating an initial group for a color that has not been assigned to any other group. At step 2 of the method depicted in FIG. 5, the method may continue with selecting group function icons 10 for a scene, i.e., room type. Using a graphical interface for controlling lighting, selecting a group function icon 10 may begin with using a pointing device, which can include finger contact, i.e., finger line drawing through a touch screen interface, to select a group function icon 10 from the column/menu of group function icons on the screen image depicted in FIG. 2. It is noted that the pointing device is not limited only to finger touch through touch screen interface, as any pointing device, such as mouse, touchpad, trackball or similar type devices, may be used to select the group function icon 10 from the screen image depicted in FIG. 2.

The screen shot depicted in FIG. 2 is only one example of a screen for a graphic user interface for use with the methods described herein, and is not intended to limit the disclosed methods, systems and computer program products to only this example of a screen shot.

In a following step, the method may continue with assigning a color to the group function icons 10 at their periphery to provide color coded group icons 25 having a first color coded peripheral 30 at step 3 of the method depicted in FIG. 5. This color is specific for designating the group function icon 10 being configured at this step of the process flow, and the color selected at this stage has not been assigned to any other group function icon 10. In some embodiments, assigning a color to the group function icons 10 can include selecting a color icon 18 from the color for coding column/menu that is depicted in the screen shot for the interface illustrated in FIG. 2, and linking the selected color to a group function icon 10. The linking operation can be achieved by contacting a selected group function icon 10 from the group function icon column/menu to a selected color icon 18 from the color for coding column/menu of the interface depicted in the screen shot illustrated in FIG. 2. The linking operation can be a drag-drop operation of the selected group function icon 10 into the selected color icon 18. The linking operation can also be a drag-drop operation of the selected color icon 18 into the selected group function icon 10. The drag-drop operations can be performed using a pointing device, such as a track mouse or touchpad. In further embodiments, the linking operation can be provided using a touch screen type pointing device, in which a line can be drawn between the selected color icon 18 and the selected group function icon 10.

Figure 6:
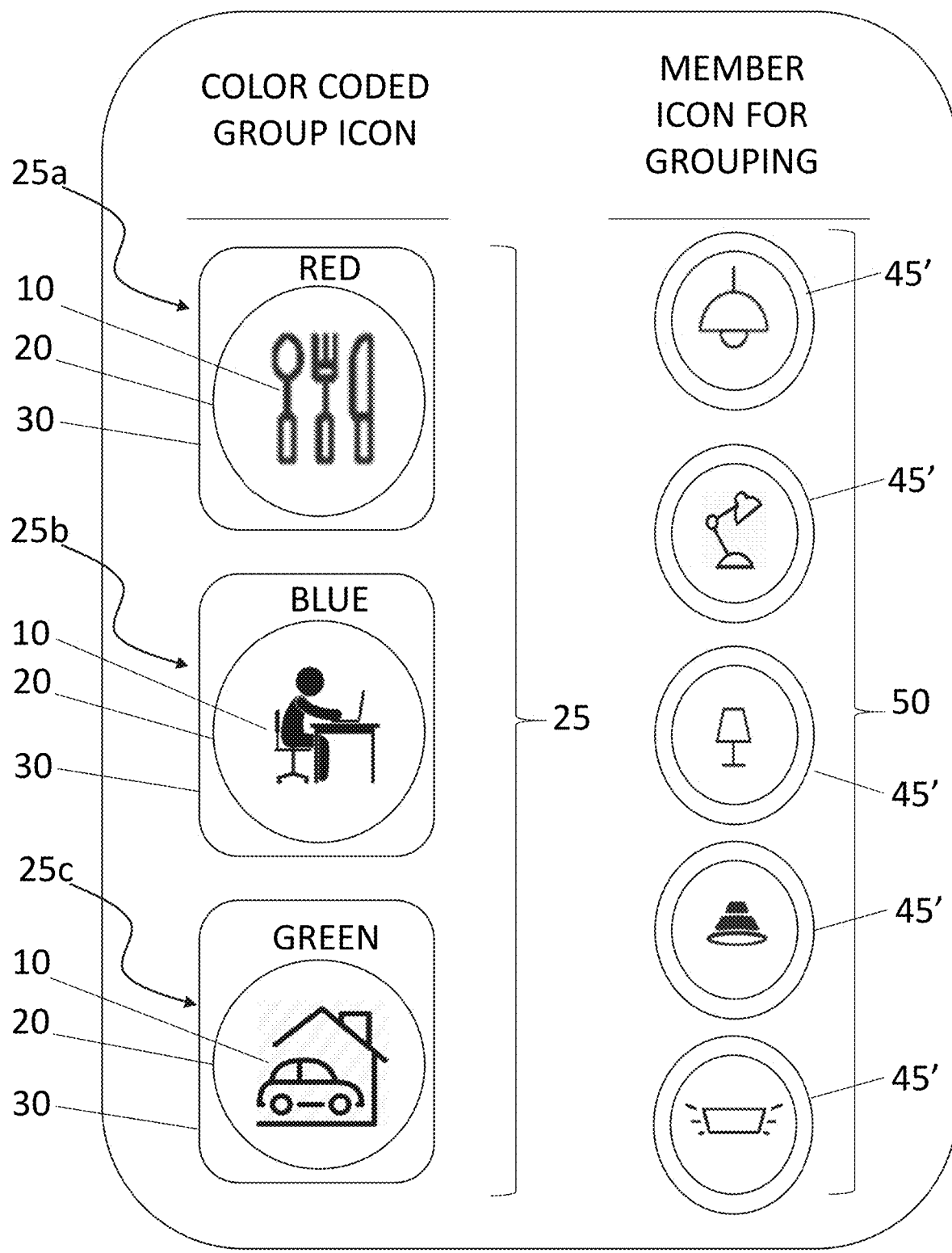
FIG. 6 is an illustration of a screen shot of a graphic user interface depicting a plurality of color coded group icons designating scenes and a plurality of member icons designating light function forms for grouping the member icons to the color coded group icons, in accordance with an embodiment of the present disclosure.

The linking operation between the selected color icon 18 and the selected group function icon 10 provides a color coded group icon 25, 25', in which the color from the selected color icon 18 is displayed at a periphery of the group function icon 10 to provide a color coded peripheral 30. For example, linking a red color icon 18 with the dining/kitchen function icon 11 for the group function icon 10 would provide a group icon 25, 25' having a red color coded peripheral about the group function icon 10 designating the scene, i.e., room type, to be a dining room/kitchen, as further described in FIGS. 1A and 1B. Following assigning a color to the group function icon 10, the group icon 25 having the color coded peripheral 30 is depicted on screen of an interface for grouping with member icons 50, as depicted in FIG. 6. The assignment of the color to the group function icon 10 may be repeated for each scene, i.e., room type, in which lighting control is desired.

FIG. 6 is an illustration of a screen shot of a graphic user interface depicting a plurality of color coded group icons 25 designating scenes, and a plurality of member icons 50 designating light function forms for grouping the member icons 50 to the color coded group icons 25. The color coded group icons 25 are present arranged on the screen shot of the page for grouping the member icons 50 to the color coded group icons 25, in a column/menu titled color coded group icons. In addition to the group icon 25a including the red color coded peripheral 30 about a group function icon 10 designating a dining/kitchen scene that is present in the column/menu titled color coded group icons depicted in FIG. 6, the color coded group icons column/menu may further include a group icon 25b having a group function icon 10 designating an office having a color coded peripheral 30 that is blue, and a group icon 25c having a group function icon 10 designating a garage having a color coded peripheral 30 that is green. It is noted, that the example depicted in FIG. 6 is only one example, and is not intended to limit the present disclosure, as any number of group icons 10 may be color coordinated to designate any number of rooms for lighting control.

The screen shot depicted in FIG. 6 is only one example of a screen for a graphic user interface for use with the methods described herein, and is not intended to limit the disclosed methods, systems and computer program products to only this example of a screen shot.

Referring to FIG. 5, the method may continue at step 4 with selecting member format icons 35 for light function forms, e.g., lamp types, to provide member icons 50 to be correlated to the scenes designated by the group icons 25, wherein a group identifier for the member icon 50 is present at a periphery of the member format icon 35. The group identifier for the member icon 50 may be a neutral color coded peripheral 45 prior to being color coded, which can be white or the same color of the background that the member format icon 35 is overlying. FIG. 4 depicts one embodiment of a screen shot of an interface from which member format icons 35 may be selected. The member format icons 35 may be selected using a pointing device, such as a mouse, or selected by touch gesture, e.g., multi-touch gesture, using a touch screen.

The screen shot depicted in FIG. 4 is only one example of a screen for a graphic user interface for use with the methods described herein, and is not intended to limit the disclosed methods, systems and computer program products to only this example of a screen shot.

Following selecting a member format icon 35 to be grouped to the group icon 25 having the color coded peripheral 30, the member format icon 35 is depicted on screen of an interface for grouping the group icons 25 and the member icons 50, as depicted in FIG. 6. The selected member format icons 35 may be depicted as member icons 50 having color coded peripheral regions 45' that indicate a neutral state, i.e., the color coded peripheral 45 has no color coding designated. The member icons 50 can be arranged on the screen for grouping to group icons 25 in a column/menu titled member icon for grouping, as depicted in FIG. 6. The selection of the member format icon 35 may be repeated until each type of light function form, e.g., pedestal light, desk lamp, table lamp, ceiling recessed lamp, etc., is selected that the user wishes to group to a scene or room type, in which lighting control is desired.

Referring to FIG. 5, in a following step, at least one member icon 50 can be grouped to a color coded group icon 25 at step 5. In some embodiments, the color from the first color coded peripheral 30 of the color coded group icon 25 is displayed in the group identifier of the member icon 50 as at least a segment of a second color coded peripheral 45 illustrating grouping between the group icon 25 and the member icon 50. Grouping between the group icon 25 and the member icon 50 can be provided by a linking operation using a graphic interface depicting the group icons 25 and the member icons 50 to be linked, the linking operation being executed using a pointing device, such as a mouse, or touch gestures, e.g., touch gestures on a touch screen.

FIG. 6 illustrates a screen shot of a graphic user interface depicting a plurality of color coded group icons 25 designating scenes, i.e., room types, and a plurality of member icons 50 designating light function forms for grouping the member icons 50 to the color coded group icons 25. Using linking operations, such as drag and drop operations using a mouse type pointing device, or line drawings operations using touch screens, the member icons 50 from the member icon for grouping column/menu can be contacted to the group icons 25 from the color coded group icon column/menu, and vice versa. When the color coded group icon 25 is contacted to the member icons 50, the color from the color coded peripheral 30 of the color coded group icon 25 is assigned to the color coded peripheral 45 of the member icons 50, which designates that the member icon 50 has been grouped to the color coded group icon 25.

Figure 7:
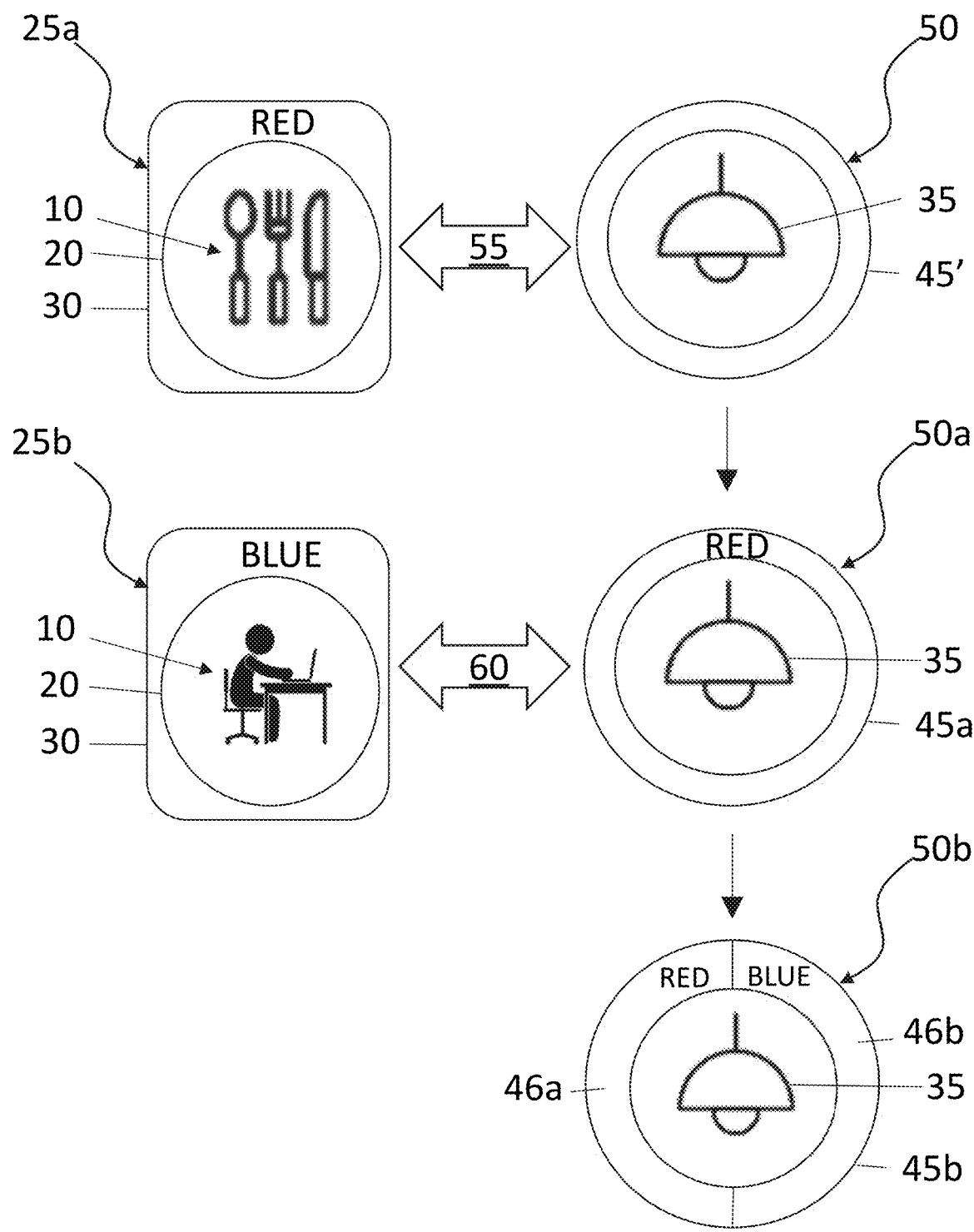
FIG. 7 is an illustration depicting interaction of group icons and member icons for a process sequence of adding a member from a group, in accordance with one embodiment of the present disclosure.

FIG. 7 further illustrates the interaction of group icons 25a, 25b and member icons 50, 50a, 50b for a process sequence of adding a member, i.e., light function form (also referred to lamp type), to a group, i.e., scene (also referred to as room type). For example, to group a member icon 50 from the member icon for grouping column/menu of the screen depicted in FIG. 6 to a group icon 25a that designates a dining/kitchen scene from the color coded group icon column/menu of the screen depicted in FIG. 6, a first linking operation 55 contacts the member icon 50 designating the pendent light to the group icon 25a designating the dining/kitchen scene. The first linking operation 55 between the group icon 25a and the member icon 50 can be executed on the screen depicted in FIG. 6 through a graphic user interface using a pointing device, such as a mouse, or touch gestures, e.g., touch gestures on a touch screen.

Referring to FIG. 7, before being grouped, the member icon 50 having a member format icon 35 designating a pendant lamp has a color coded peripheral 45' that has not been color coded, e.g., is in a neutral state. As illustrated in FIGS. 6 and 7, the group icon 25a having the group function icon 10 designating the dining/kitchen room is color coded red by a color coded peripheral 30 that is red in color. After the first linking operation 55, the neutral color coded peripheral 45' of the member icon 50 that was not previously grouped is converted to the same red color as the red color of the color coded peripheral 30 of the group icon 25a designating the dining/kitchen room, which indicates that the member icon 50a is now grouped, i.e., grouped to the color coded group icon 25a having the same color coding.

Referring to FIG. 7, after the first linking operation 55, the color coded peripheral 45a of the member icon 50a having the member format icon 35 designating a pendant lamp is color coded red to designate grouping with the group icon 25a having a color coded peripheral 30 with the same red color. The color coded peripheral 30 for the group icon 25a is color coded red to designate a scene for a dining room/kitchen. The same color coding between the color coded peripheral 45a of the member icon 50a and the color coded peripheral 30 of the group icon 25a designates a grouping of a light function form of pedestal lights to a scene for a dining room/kitchen. Further, the color coded peripheral 45a of the member icon 50a being a single segment illustrates grouping to only a single group icon 25a. Further details regarding the member icon 50a having the color coded peripheral 45a of a signal segment are provided above with reference to FIG. 3A.

Although not depicted in FIG. 6, the member icon for grouping column/menu may be updated so that the member icon 50 designating the pendant lighting has a color coded peripheral 45a indicting grouping to a color coded group icon, e.g., the group icon 25a color coded to the dining/ restaurant scene.

FIG. 7 also depicts one embodiment of grouping the member icon 50a, which had been previously grouped to the group icon 25a designating a dining/kitchen scene, to a second group icon 25b, which includes a group function icon 10 designating an office scene. For example, to group a second group icon 25b for an office scene to the member icon 50a designating a pendent light as the light function form and having a color coded peripheral 45a indicating grouping to a first group icon 25a, a second linking operation 60 contacts the member icon 50a designating the pendent light to the group icon 25b designating the office scene, which has a blue color coded peripheral 30. The second linking operation 60 may employ a graphic interface to execute the second linking operation 60 using a pointing device, such as a mouse, or touch gestures, e.g., touch gestures on a touch screen.

Referring to FIG. 7, before being grouped to a second group icon 25b, the member icon 50a having a member format icon 35 designating a pendant lamp has a single segment color coded peripheral 45a that is red in color indicating grouping to the first group icon 25a to the dining/kitchen scene. As illustrated in FIGS. 6 and 7, the group icon 25b having the group function icon 10 designating the office room is color coded blue having a color coded peripheral 30 that is blue in color. After the second linking operation 60, the single segmented red color coded peripheral 45a of the member icon 50a is converted to two segment color coded peripheral 45b. The two segment color coded peripheral 45b has a first segment 46a with a red color that is the same red color of the color coded peripheral 30 of the group icon 25a designating the dining/kitchen room, and a second segment 46b with a blue color that is the same blue color of the color coded peripheral 30 of the group icon 25b designating the office scene. Further details regarding the member icon 50b having the two-segmented color coded peripheral 45b are provided above with reference to FIG. 3B.

Although not depicted in FIG. 6, the member icon for grouping column/menu may be updated so that the member icon 50b designating the pendant lighting has a color coded peripheral with two segments indicting grouping to two color coded group icons, e.g., the group icon 25a color coded to the dining/restaurant scene, and the group icon 25b color coded to the office scene.

The number of color segments of a member icon periphery corresponds to the number of different groups that the member device belongs to.

It is noted that the example depicted in FIG. 7 illustrates only one example, and is not intended to limit the present disclosure, as any combination of colors, member icons 50, member format icons 35, group icons 25, and group function icons 10 may be employed to group scenes, such as room types, to light function forms, such as lamp types.

Referring back to FIG. 5, in some embodiments, the method of lighting that is disclosed herein can continue with assigning scene groups, i.e., lighting effects, to the member icons 50 and/or the group icons 25, at step 6. A scene group, which can also be referred to as a lighting effect, is when a lamp type or the plurality of lamps within a scene, i.e., room, has a designated light setting, such as color, color temperature, brightness, softness, high key lighting, low key lighting, as well as other known light types and settings, which can include an identifier illustrating an "on" state or an "off" state for a type of lighting. As noted above with reference to FIGS. 1A-1B and 3A-3D, the icon background 20 for the group function icon 10 of the group icons 25, 25' and/or the icon background 40 for the member format icon 35 of the member icons 50a, 50b, 50c, 50d can be used to depict a scene group, i.e., lighting effect. Linking a scene group, i.e., lighting effect, to a member icon 50a, 50b, 50c, 50c indicates that the light function form designated by the member icons performs the lighting effect. Linking a scene group, i.e., lighting effect, to a group icon 25, 25' indicates that all the light function forms grouped to the group icon 25, 25' in the scene, e.g., room type, perform the lighting effect.

Figure 8:
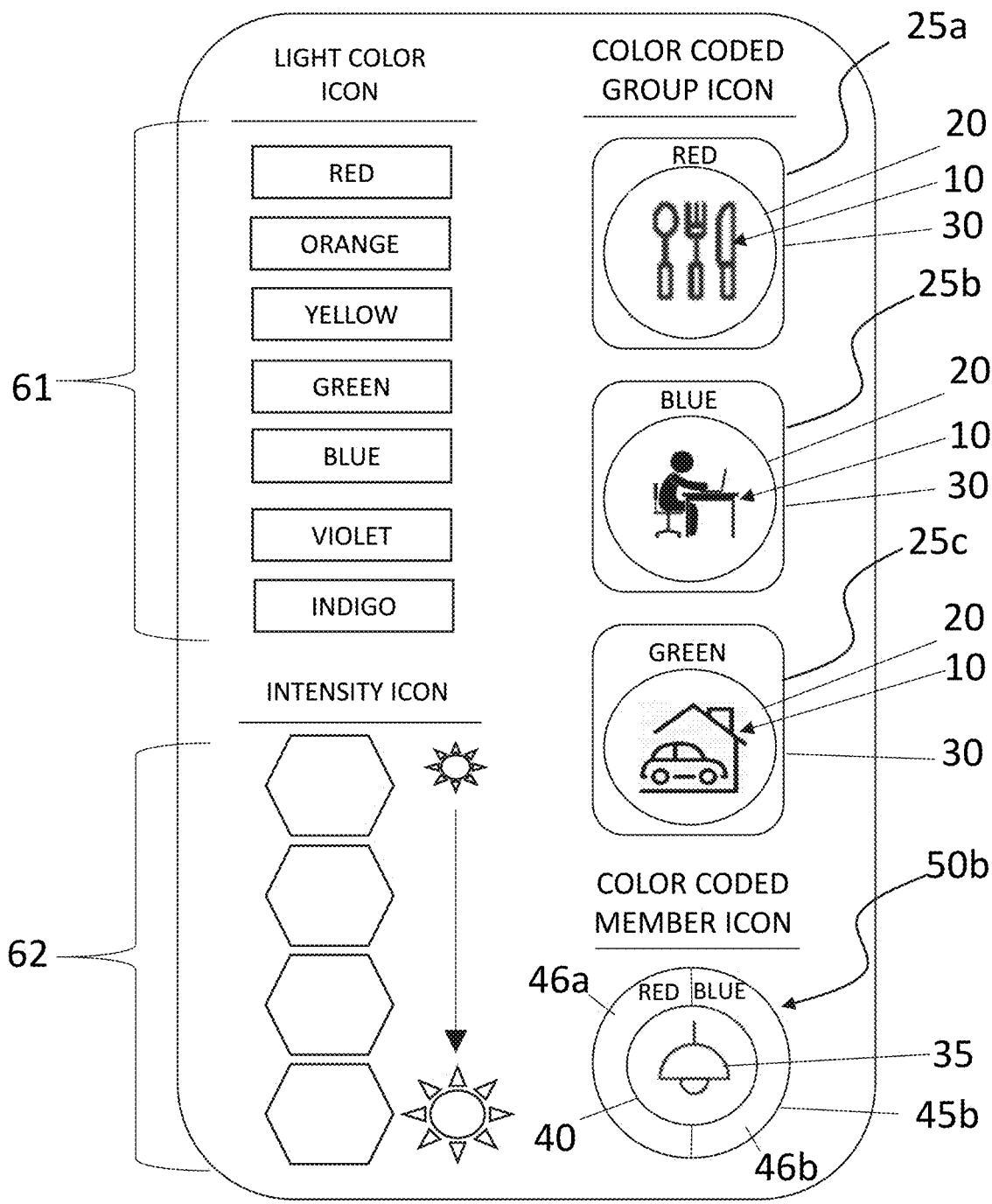
FIG. 8 is an illustration of a screen shot of a graphic user interface (GUI) for grouping a scene group, i.e., lighting effect, to at least one of a group icon and a member icon, in accordance with one embodiment of the present disclosure.

FIG. 8 depicts an illustration of a screen shot from a graphic user interface (GUI) for grouping a scene group, i.e., lighting effect, to at least one of a group icon 25a, 25b, 25c and a member icon 50b. The lighting effects included in the screen shot depicted in FIG. 8 include lighting color, in which each light color that can be selected for the lighting has a user selectable light color icon 61. The color of the light color icon 61 matches the color of the light effect that is grouped to the group icon 25a, 25b, 25c and/or the member icon 50 by linking the light color icon 61 with at least one of the group icon 25a, 25b, 25c and/or the member icon 50b.

The lighting effects can also include light intensity, in which the plurality of intensity icons 62 depicted on the screen for grouping the light effects to the group icons 25a, 25b, 25c and/or the member icons 50b have a pattern that illustrates the different light intensities that can be selected to be produced by the lamps. More specifically, in this example, a higher density cross hatching for the intensity icons 62 illustrates higher light intensity, while a lower density cross hatching illustrates a lower light intensity.

Although the lighting effect icons 61, 62 are depicted as hexagons, the geometry of the icons can have any geometry, such as being square, rectangular, round or oval, as well as having regular and irregular polygon shapes.

The screen for grouping scene groups, i.e., lighting effects, to the light function forms, such as lamp types, and scenes, such as rooms, also includes color coded group icons 25a, 25b, 25c and color coded member icons 50b. As explained above, the color coded member icons 50b and color coded group icons 25a, 25b, 25c illustrate what types of lamps are grouped to the different types of scenes. In some embodiments, a user employing a pointing device or touch screen device can use the graphic user interface to perform linking operations between the icons for the lighting effects 61, 62 and the member icons 50b. In some embodiments, a user employing a pointing device or touch screen device can use the graphic user interface to perform linking operations between the icons 61, 62 for the lighting effects and the group icons 50b.

It is noted that the screen shot depicted in FIG. 8 is only one example of what may be employed as a screen for grouping scene groups to member icons 50b and/or group icons 25a, 25b, 25c, and it is not intended that present disclosure be limited to only this example. For example, any number of member icons 50, which may or may not be color coded to identify grouping to group icons 25, and any number of group icons 25 may be present on the interface for grouping with the icons 61, 62 for the lighting effects.

Figure 9:
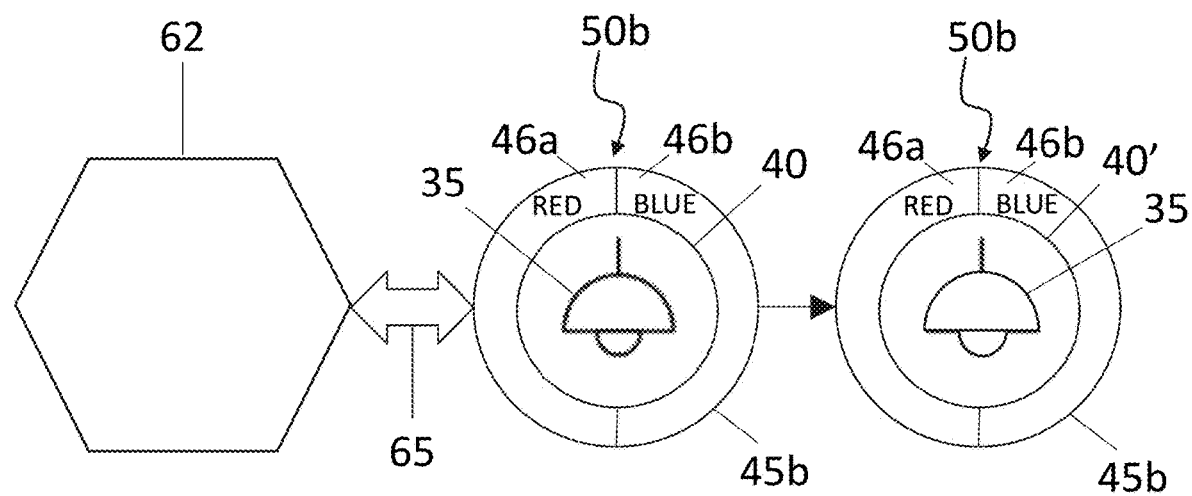
FIG. 9 is an illustration depicting the interaction of a member icon for a process sequence of adding a scene group, i.e., lighting effect, in accordance with one embodiment of the present disclosure.

FIG. 9 depicts one embodiment of the interaction of a member icon 50b and a lighting intensity icon 62 for a process sequence of grouping a scene group, i.e., lighting effect, to the member icon 50b, in which the member icon 50b has been grouped with two group icons 25a, 25b, i.e., linked to two different scenes. Adding the scene group to the member icon 50b can include a linking operation 65. In the example depicted in FIG. 9, the member icon 50b includes two color coded segments 46a, 46b for the color coded peripheral 45b, in which a red color coded segment 46a indicates that the pedestal lamp type designated by the member icon 50b is grouped to a dining/kitchen scene, and a blue color coded segment 46b indicates that the pedestal lamp type designated by the member icon 50b is also grouped to an office scene.

Referring to FIG. 9, before the light effects, i.e., scene group, are grouped to the member icon 50b, the icon background 40 of the member icon 50b is neutral. By "neutral" it is meant that the icon background 40 does not have any designation for illustrating grouping with a lighting effect. In one example, the neutral state for the icon background 40 of the member format icon 35 of the member icon 50 is free of any color consistent with a color effect for the lamp type being designated by the member icon 50. For example, the neutral state for the icon background 40 can be grey, or can be white, or the same color of the background the member format icon 35 is overlying.

In the example depicted in FIGS. 8 and 9, the member icon 50b is grouped with a light intensity icon 62. In one example, to group a member icon 50b from the color coded member icon column/menu of the screen shot depicted in FIG. 8 to icons 61, 62 for lighting effects, a third linking operation 65, as depicted in FIG. 9, contacts the member icon 50b designating the pendent light to the light intensity icon 62 designating a moderate light intensity. The third linking operation 65 can be executed using a pointing device, such as a mouse, or touch gestures, e.g., touch gestures on a touch screen.

Referring to FIG. 9, after the third linking operation 65 grouping the icon 62 for light intensity to the member icon 50b, the icon background 40' for the member icon 50b is converted from the neutral state to a state indicating the grouping of the light intensity icon 62 for the light effect to the member icon 50b. In the example depicted in FIG. 9, the icon background 40' of the member icon 50b having the member format icon 35 designating a pendant lamp is patterned in the same manner and same density of cross hatching as the light intensity icon 62 following the third linking operation 65. The same patterning for the light intensity icon 62 for the light effect, and the icon background 40' for the member icon 50b following the third linking operation 65 designates a grouping of a scene group, i.e., lighting effect, to a light function form, e.g., lamp type. Following grouping of the scene group, i.e., lighting effect, to the member icon 50b, the lamp types controlled through the member icon 50b will perform the designated light effect.

It is noted that the above described linking operation 65 is equally applicable for grouping the color light effects depicted by the light color icons 61 to the member icon 50b, e.g., by performing the linking operation between the light color icons 61 to the member icon 50b. In this example, after the linking operation, the icon background 40 of the member icon 50b is color coded to the color of the light color icon 61 being grouped. The lamp types controlled through the member icon 50b will perform the designated light effect, e.g., color lighting consistent with the selected light color icon 61. In some embodiments, more than one color effect may be grouped to a member icon 50b. For example, to group both lighting color and lighting intensity effects to a member icon 50b, linking operations can be performed between both a color lighting icon 61 and the member icon 50b, and a light intensity icon 62 and the member icon 50b. In this example, the icon background 40 has a color designating the color lighting effect that corresponds to the color lighting icon 61, and the icon background 40 also has a pattern, in which the density of cross hatching corresponds to the color intensity icon 62. In this example, both a color and intensity of a lamp may be designated to the icon background.

The linking operations for grouping the group scenes, i.e., light effects, to the member icons 50b that have been described with reference to FIG. 9 are equally applicable to assigning group scenes, i.e., light effects, to group icons 25. When a group scene, i.e., lighting effect, is grouped to a group icon 25 all of the lamps that have been grouped to the group icon 25 will display the lighting effects. For example, if a light effect for soft lighting is assigned to the icon background 20 of the group icon 25 designating a kitchen, all of the light function forms, i.e., lamp types, designated by the member icon 50 that is grouped to the group icon 25 will illuminate soft lighting.

Although not depicted in FIG. 8, after the third linking function 65, the member icon 50b in the color coded member icon column/menu may be updated so that the member icon 50b having the assigned group scene, i.e., lighting effect, has an icon background 40 that is indicative of the light color icon 61 and/or the intensity icon 62 that has been grouped to the member icon 50b. Similarly, the icon background 20 of the group icons 25a, 25b, 25c in the color coded icon column/menu may be coded, e.g., by pattern and/or color, following a linking function that is indicative of the light color icon 61 and/or the intensity icon 62 that has been grouped to the group icons 25a, 25b, 25c. It is noted that scene grouping, i.e., lighting effects, may be omitted, as it is not necessary that lamps be assigned a lighting effect.

The screen shot depicted in FIG. 8 is only one example of a screen for a graphic user interface for use with the methods described herein, and is not intended to limit the disclosed methods, systems and computer program products to only this example of a screen shot.

Referring to FIG. 5, in a following step the user can decide if all the grouping operations that they desire are completed, or if further grouping operations, or if maintenance to the system of lighting changes and adjustments are needed to correspond to the different needs of different users. When further grouping operations are/or maintenance is needed the method can repeat from step 1, as illustrated in the flow chart depicted in FIG. 5. If no further grouping operations and/or maintenance is required the method can continue to step 8.

Figure 10:
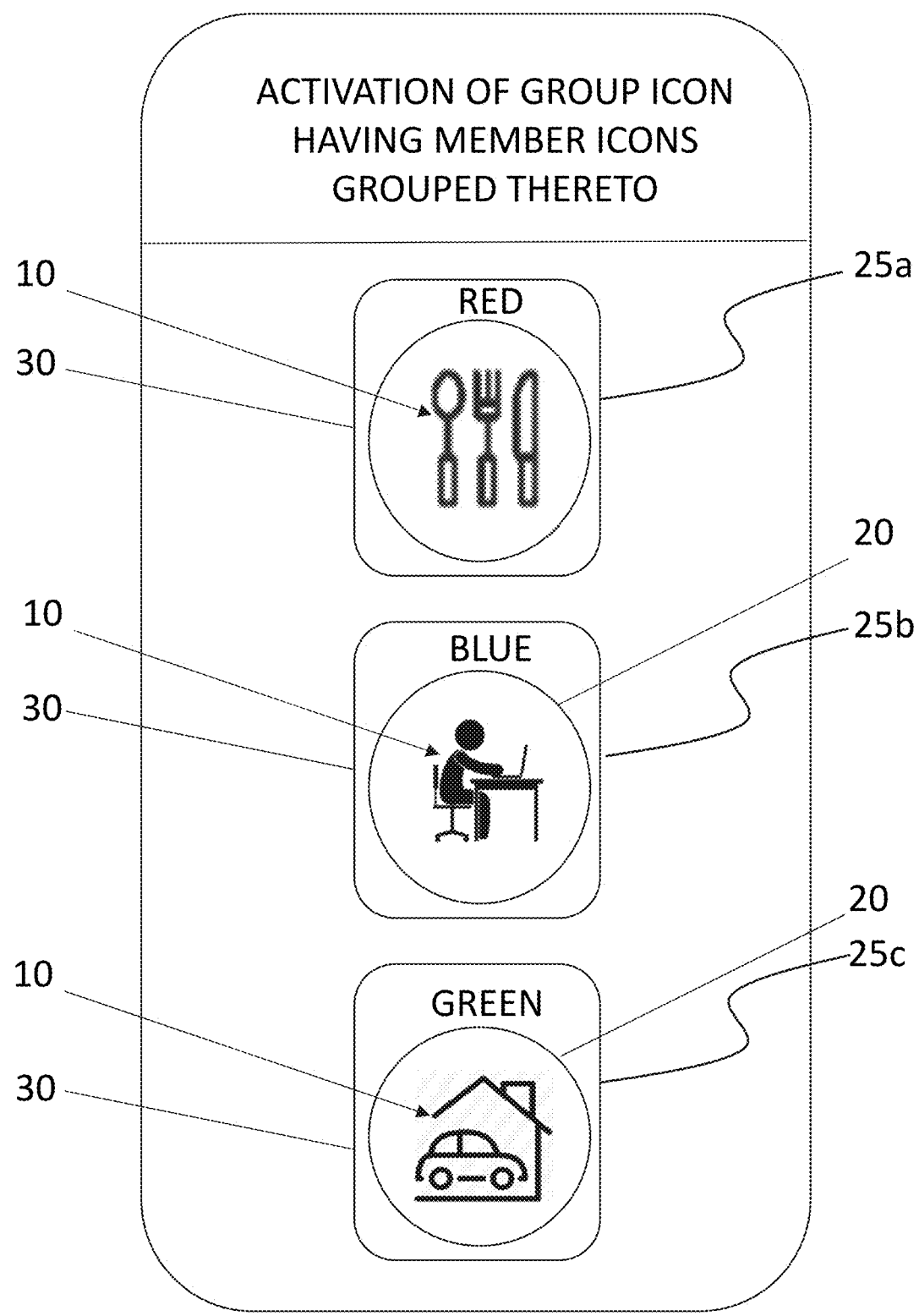
FIG. 10 is an illustration of a screen shot of a graphic user interface (GUI) for activating lamps within a scene by activating a group icon having member icons grouped thereto, in accordance with one embodiment of the present disclosure.

Referring to FIG. 5, the lighting method can continue at step 8 with activating the at least one lamp of the member icon 50 being grouped to the group icon 25a, 25b, 25c by selecting the group icon 25a, 25b, 25c having the first color coded peripheral 30 matching the second color coded peripheral 45 of the member icon 50. FIG. 10 is an illustration of a screen shot of a graphic user interface (GUI) for activating lamps within a scene by activating a group icon 25a, 25b, 25c having member icons 50 grouped thereto. The group icons 25a, 25b, 25c may also be grouped to scene groups, i.e., lighting effects. In one example, the group icons 25a, 25b, 25c can be arranged in a column/menu titled activation of group icon having member icons grouped thereto.

The group icons 25a, 25b, 25c can be selected using a pointing device, such as a mouse, or selected by touch gesture, e.g., multi-touch gesture, using a touch screen. For example, selection of the group icons 25a, 25b, 25c activates the lamps designated by the group function icon 10 by either turning the lights "on" or "off" in the scene, i.e., room type. The lamps that are activated in the scene designated by the group icons 25a, 25b, 25c are grouped to the scene by the grouping of the member icons 50 to the group icon 25a, 25b, 25c, as described above. An activated scene can be depicted in the group icons 25a, 25b, 25c by a color change or form of illumination of a portion of the group icon 25a, 25b, 25c, such as the icon background 20, being depicted on the screen of the user interface. The screens for activating the at least one lamp of the member icon being grouped to the group icon 25a, 25b, 25c by selecting the group icon 25a, 25b, 25c can also include icons for dimming or brightening the lighting of a scene designated by the group icons 25a, 25b, 25c.

The screen shot depicted in FIG. 10 is only one example of a screen for a graphic user interface for use with the methods described herein, and is not intended to limit the disclosed methods, systems and computer program products to only this example of a screen shot.

Figure 11:
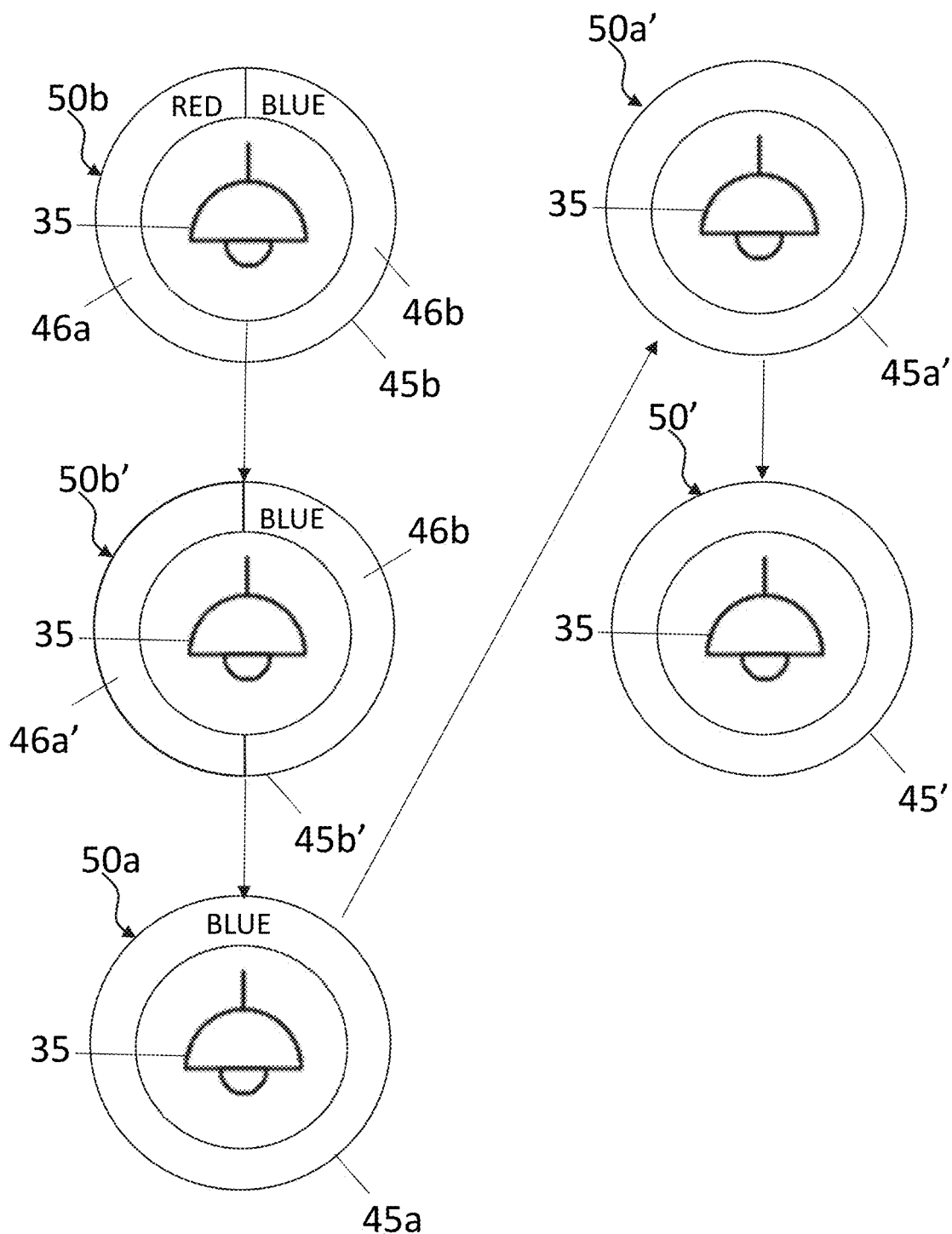
FIG. 11 is an illustration depicting the interaction of group icons and member icons for a process sequence of withdrawing a member from a group, in accordance with one embodiment of the present disclosure.

In addition to grouping member icons 50 and scene groups, i.e., lighting effects, the methods, systems and computer program products described herein also provides for de-grouping member icons and scene groups. FIG. 11 depicts the interaction of group icons 25 and member icons 50b for a process sequence of withdrawing a member from a group. The member icon 50b depicted in FIG. 11 prior to withdrawing the member icon 50b from a group includes a color coded peripheral 45b including two color coded segments 46a, 46b. In this embodiment, the first color coded segment 46a is color coded red, designating grouping of the member icon 50b to a group icon 25a having a red color coded peripheral 30 about a group function icon 10, which designates a dining/kitchen scene. The second color coded segment 46b is color coded blue designating grouping of the member icon 50b to a group icon 25b having a blue color coded peripheral 30 about a group function icon 10 designating an office scene.

In some embodiments, withdrawal from a group can be accomplished by highlighting a target color segment of the color coded peripheral 45b of a member icon 50b. In the example depicted in FIG. 11, the first color coded segment 46a, which is color coded red, is the target color segment 46a'. The target color segment 46a' is selected from any screen of the interface indicating color coded grouping. The target color segment 46a' may be selected using a pointing device, such as a mouse, or selected by touch gesture, e.g., multi-touch gesture, using a touch screen. When the target color segment 46a' is selected, it may be highlighted on the member icon 50b'. Withdrawal of the target color segment 46a' may be accomplished using a delete function.

In some embodiments, withdrawal of the target color segment 46a' is successfully completed when the color coded peripheral 45a of the member icon 50a is converted to a single segment color coded peripheral 45a. In the example depicted in FIG. 11, the single segmented color coded peripheral 45a is a single color illustrating that the member icon 50a is now grouped to only a single group icon 25b. For example, the single segmented color coded peripheral 45a may be blue designating grouping of the member icon 50a to a group icon 25b having a blue color coded peripheral 30 about a group function icon 10 designating an office scene.

The de-grouping functions can continue with withdrawing the remaining single color coded group from the member icon 50a. In some embodiments, withdrawal of a group from the member icon 50a can be accomplished by highlighting the remaining color segment of the color coded peripheral 45a of a member icon 50b. The highlighted remaining color segment of the color coded peripheral 45a' of the member icon 50a' may then be withdrawn by a delete function. When the withdrawal function is completed, the color coded peripheral 45' changes to a neutral state, e.g., being gray in color, white in color, or having a color matching a screen in the background of the member icon 50'. The neutral state of the color coded peripheral 45' indicates that the member icon 50' is not grouped with any group icon 25a, 25b, 25c.

The de-grouping function depicted in FIG. 11 can be applied to withdrawing a scene group, i.e., grouped lighting effect, from a member icon 50. As described above with reference to FIG. 9, designation of scene groups can be through assigning colors, and patterns, as well as other designating symbols, to the icon background 40 of a member icon 50. Further, designation of scene groups can also be achieved to assigning colors, and patterns, as well as other designating symbols to the icon background 20 of the group icons 25. Withdrawal of the scene group from a light function form, i.e., lamp type, designated by a member icon 50 can be accomplished by selecting the icon background 40 from a screen of a graphic user interface using a pointing device, such as a mouse, or selected by touch gesture, e.g., multi-touch gesture, using a touch screen. Following selection, the icon background 40 to which a scene group has been previously linked is highlighted. A delete function may then withdraw the highlighted icon background 40. If successful, the icon background 40 may change to a neutral state indicating that the member icon 50, i.e., lamp type, is no longer grouped to a scene group, i.e., lighting effect.

Withdrawal of the scene group from a scene i.e., room type, designated by a group icon 25 can be accomplished by selecting the icon background 20 from a screen of a graphic user interface using a pointing device, such as a mouse, or selected by touch gesture, e.g., multi-touch gesture, using a touch screen. Following selection, the icon background 20 to which a scene group has been previously linked is highlighted. A delete function may then withdraw the highlighted icon background 20. If successful, the icon background 20 may change to a neutral state indicating that the group icon 25, i.e., room type, is no longer grouped to a scene group, i.e., lighting effect.

Figure 12:
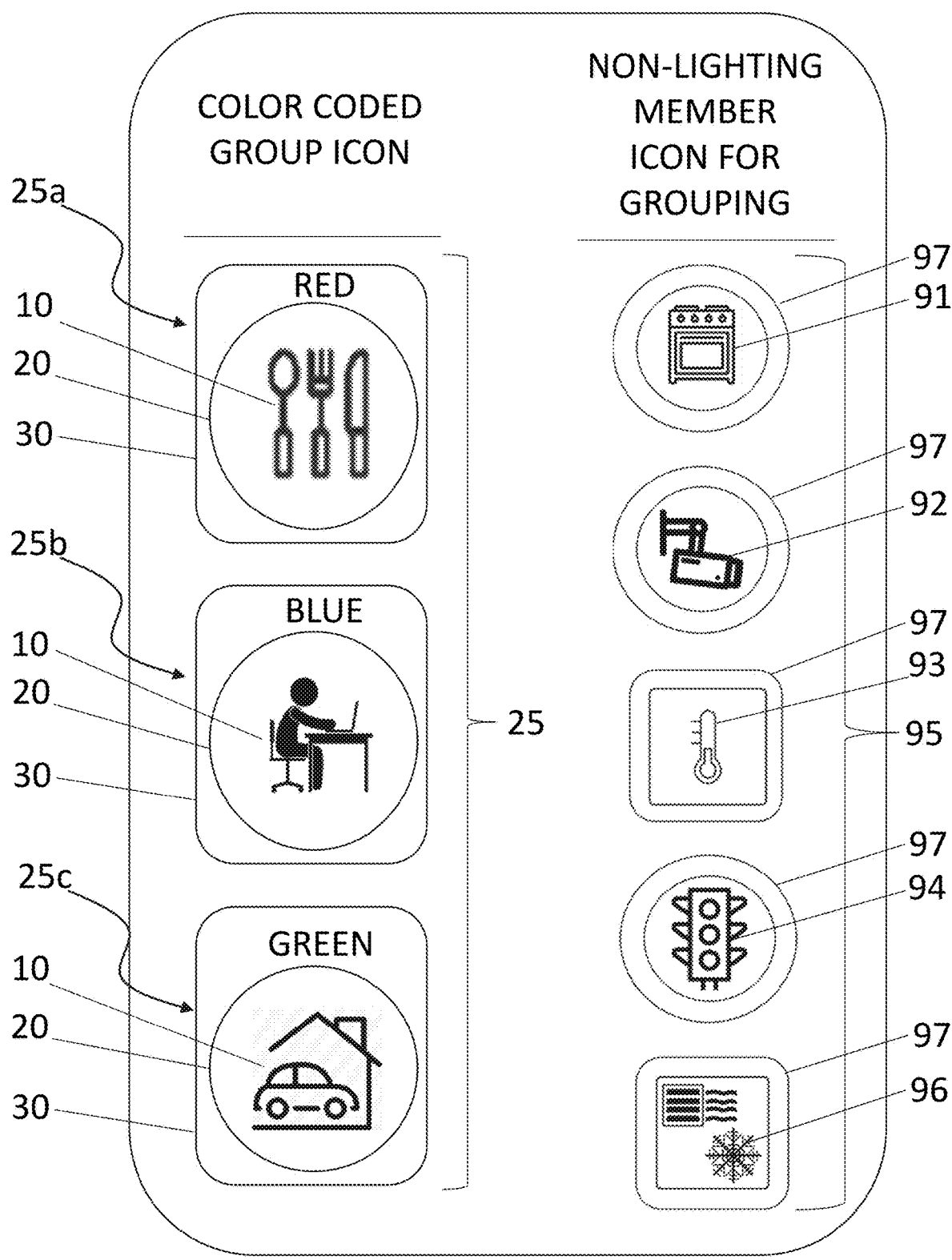
FIG. 12 is an illustration of a screen shot of a graphic user interface depicting a plurality of color coded group icons designating scenes and a plurality of non-lighting member icons for grouping the non-lighting member icons to the color coded group icons, in accordance with an embodiment of the present disclosure.

The methods, systems and computer program products described herein are not limited to only lighting applications. FIG. 12 is an illustration of a screen shot of a graphic user interface depicting a plurality of color coded group icons 25 designating scenes and a plurality of non-lighting member icons 95 for grouping the non-lighting member icons 95 to the color coded group icons 25. Exemplarily applications for the grouping operations include, but are not limited to wired or wireless residential internet of things (IOT) applications, where various homotypic and heterotypic domestic items, appliances, sensors, and HVAC equipment can be grouped to scene types through group icons 25. The grouping methods may also be applied to wired or wireless commercial facilities where various homotypic and heterotypic items, appliances, control accesses, sensors, security cameras, and HVAC equipment, can be grouped, sub-grouped, tracked and controlled. The group methods may also be applied to wired and wireless smart city scenarios where street lighting fixtures, parking meters, monitoring cameras, traffic controls, charge stations, and emergency assistance units can be grouped, sub-grouped, tracked and controlled. One example of a non-lighting member icon 95 for an appliance is the oven/stove icon identified by reference number 91. One example of a camera icon is provided by the security camera icon identified by reference number 92. One example of a non-lighting member icon 95 for a sensor is the temperature sensor icon identified by reference number 93. A traffic light icon is identified by reference number 94. One example of a non-lighting member icon 95 for HVAC equipment is identified by reference number 96. Each of the non-lighting member icons 95 include a color identifier for illustrating grouping which may be provided by a color coded peripheral 97, as depicted in FIG. 12. Using linking operations employing pointing devices, the non-lighting member icons 95 may be grouped to the color coded group icons 25, in which non-lighting member icons 95 grouped to a group icon 25 will have a color coded peripheral having the same color as the color coded peripheral 30 of the group icon 25 to which the non-lighting member icon 95 is grouped. Further details for the linking operations have provided above with reference to FIG. 6

Figure 13:
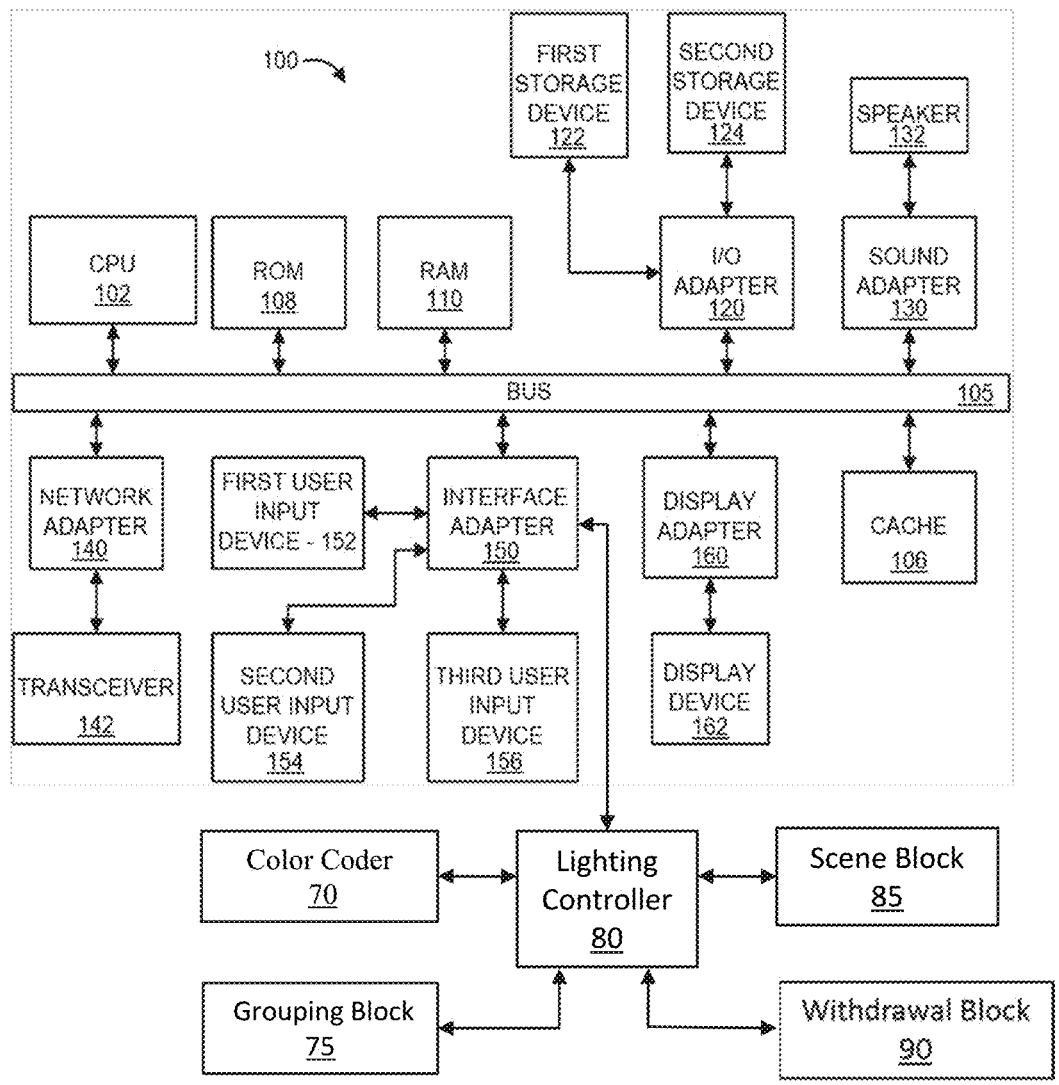
FIG. 13 shows an exemplary system for controlling grouping operations in lighting controls, in accordance with an embodiment of the present principles.

FIG. 13 shows an exemplary system 100 for controlling grouping operations in lighting controls. The system 100 can provide a control terminal for running the graphic user interface used to group member icons 50 and group icons 25, and group lighting effects, as described above with reference to FIGS. 1A-12. The system 100 may include at least one a processor, e.g., hardware processor, that is coupled to a memory, in which the processor is configured to color code the group icons 25 using a color coder 70; group the member icons 50 to the group icons 25 using a grouping module 75 (depicted by grouping block 75); and activate the lighting designated by the member icons 50 that are grouped to the group icons 25 using a lighting controller 80. The color coder 70, and the grouping module (depicted by grouping block 75) are connected to the lighting controller 80, which can interface with the rest of the system 100 through an interface adapter 150 that is connected to a bus 105.

The color coder 75 can color code at least one group icon 25 for a scene in response to a first user instruction entered into a light control interface. Color coding the at least one group icon 25 has been described in more detail with reference to steps 1, 2 and 3 of the method depicted in FIG. 5, as well as the description of FIGS. 1A-2. In one embodiment, the color coder 70 can include at least one module of memory including instructions for performing the color coding steps noted above. The light control interface for interaction with the color coder 75 can be a graphic user interface having the screen shot depicted in FIG. 2, as well as FIG. 6. The at least one group icon 25 is color coded with a first type color identifier that can be provided by the color coded peripheral 30 depicted in FIGS. 1A, 1B and 6. The first user instruction may be provided by selecting a group function icon 10 using a pointing device, which can include finger contact, from the group function icon column/menu depicted in FIG. 2 and linking a color to the group function icons 10 by selecting a color icon 18 from the color for coding column/menu that is depicted in FIG. 2.

The grouping module 75 (illustrated by grouping block 75) can group at least one member icon 50 designating a light function form to the at least one group icon 25 in response to a second user instruction entered into the light control interface. Grouping member icons 50 to the at least one group icon 25 has been described in more detail with reference to steps 4 and 5 of the method depicted in FIG. 5, as well as the description of FIGS. 6 and 7. In one embodiment, the grouping module 75 can include at least one module of memory including instructions for performing the grouping steps noted above. The light control interface can be a graphic user interface having the screen shot depicted in FIG. 6. The second type color identifier of the at least one member icon 50 may be provided by the color coded peripheral 45 depicted in FIGS. 3A-3D and FIG. 7. Member icon to group icon grouping is designated when the second type color identifier has a same color as the first type color identifier. The second user instruction may be provided by the first and second linking operations 55, 60 that are described with reference to FIG. 7.

The lighting controller 80 (also referred to as lighting activator) can activate lighting in response to a third user instruction entered into the light control interface, i.e., interface adapter. Activating the lighting in response to a third user instruction selecting at least one group icon 25 has been described in greater detail with reference to step 8 of FIG. 5. The light control interface for selecting the at least one group icon 25 with the third user instruction can be a graphic user interface having the screen shot depicted in FIG. 10. The third user instruction may be provided by selecting a group icon 25 using a pointing device, which can include finger contact, from the screen shot depicted in FIG. 10. The lighting controller 80 activates, i.e., turns on or off, each light function form, e.g., lamp type, of the member icons being grouped to the at least one group icon 25 selected by the third user instruction.

The system 100 depicted in FIG. 13 can further include a scene group assigning module 85 (depicted as scene block 85) that is configured to add a lighting effect to a member icon 50 and/or a group icon 25. The scene group assigning module 85 can also be connected to the lighting controller 80. The functions of the scene group assigning module 85 are described in more detail with reference to step 6 of FIG. 5. Grouping of the scene groups can be in response to a scene group user instruction entered into the light control interface. FIG. 8 illustrates one example of a screen through which a user can enter scene group user instructions by linking color coded group icons 25 and/or color coded member icons 50 to icons for light effects 61, 62, as described with reference to FIG. 9.

The system 100 may further include a group withdrawal module 90 (depicted as a withdrawal block 90) for removing a previously grouped member 50 from a color coded group icon 25. The group withdrawal module 90 can also be connected to the lighting controller 80. The group withdrawal module 90 may include at least one module containing instructions to be performed by a processor from removing, i.e., withdrawing, a member from a group, as further described with reference to FIG. 11.

In some embodiments, the elements thereof, e.g., color coder, 70, grouping module 75, lighting controller 80, scene group assigning module 85, and group withdrawal module 90 are interconnected by a bus 105. However, in other embodiments, other types of connections can also be used, such as connection of the color coder, 70, grouping module 75, scene group assigning module 85 and group withdrawal module 90 to the bus 105 through connection to the lighting controller 80, in which the lighting controller is connected to the bus 105, as depicted in FIG. 13. The processing system 100 may also include at least one processor (CPU) 102 operatively coupled to other components via the system bus 105. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are also operatively coupled to the system bus 105.

A first storage device 122 and a second storage device 124 are operatively coupled to system bus 105 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. In some embodiments, if group information is not stored in lamps, a non-evaporative memory, i.e., storage device 122, is present in the smart control terminal, e.g., the memory may be stored in the gateway of the control terminal. The memory can store address information for the light function forms, e.g., lamp types. In some embodiments, the lamps include non-evaporative memory to store group information. The non-evaporative memory is optionally incorporated within the lamps, and in some embodiments may be omitted.

A speaker 132 is operatively coupled to system bus 105 by the sound adapter 130. A transceiver 142 is operatively coupled to system bus 105 by network adapter 140. A display device 162 is operatively coupled to system bus 105 by display adapter 160.

A first user input device 152, a second user input device 154, and a third user input device 156 are operatively coupled to system bus 105 by user interface adapter 150. The user input devices 152, 154, and 156 can be any of a keyboard, a mouse, a keypad, an image capture device, a motion sensing device, a touch screen, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as well as omit certain elements. For example, various types of wireless and/or wired input and/or output devices can be used. For example, there may be wireless and/or wired input and/or output to light function forms, e.g., lamp types.

The system 100 may also include connections for cloud bridging and cloud storage. Cloud bridging allows for the system 100, which may include an on-site data storage and operating system in the building in which the lighting is being controlled, to interconnect with cloud based resources. For example, in addition to using on site data storage, e.g., the storage capabilities of the control terminal running the graphic user interface for grouping operations, the system 100 may use the storage capabilities of a cloud based system to store group information, such as digital addresses of light function forms, e.g., lamp types, that can be utilized to group the light function forms to scenes. This information may also be stored in the light function forms, e.g., lamp types, themselves, so long as they include a form of non-evaporative memory. In some embodiments, the interconnection of the system 100 and the cloud computing environment is through a gateway. One form of gateway is a router that connects the system 100, or on site data network that is in communication with the system, to the internet. In some embodiments, the gateway is a cloud storage gateway that translates storage requests between the system 100 and the cloud based computing environment. The need for a gateway can be technology dependent, and the gateway can be omitted. The use of cloud bridging and cloud data storage is optional, and may be omitted.

The computer program product may include a computer readable storage medium (or media) having computer readable program instructions thereon for causing a processor to carry out aspects of the present disclosure. In one embodiment, the computer program products are provided by a non-transitory computer readable storage medium including contents that are configured to cause a computer to perform a method for controlling lighting. The method may include color coding at least one group icon 25 for a scene for lighting on a light control interface, the at least one group icon 25 being color coded with a first type color coded identifier (color coded peripheral 30) corresponding to the scene. The method further includes grouping at least one member 50 icon designating a light function form for at least one lamp to the at least one group icon 25 on the light control interface, the at least one member icon 50 including a second type color identifier (color coded peripheral 45). A member icon 50 being grouped to a group icon 25 has a same color for the second type color identifier for the member icon as the first type color identifier. The method can further include activating the at least one lamp of the member icon 50 being grouped to the group icon 25 by selecting the group icon having the first color identifier matching the second color identifier of the member icon 50. Further details of the method performed by the computer provided by the computer program product are provided in steps 1-8 of the method described with reference to FIG. 5.

The computer readable storage medium of the computer product can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a method, system and computer program product for controlling groupings of lamp types to scenes (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method of controlling lighting comprising:
coding at least one group icon for a scene for lighting on a light control interface, the at least one group icon being coded with a first type identifier corresponding to the scene;
grouping at least one member icon designating a light characteristic for at least one lamp to the at least one group icon on the light control interface, the at least one member icon including a second type identifier, wherein a member icon being grouped to a group icon has a same type identifier for the second type identifier for the member icon as the first type identifier, the second type identifier is present at a periphery of the at least one member icon, wherein the second type identifier comprises a plurality of segments identifying grouping of the at least one member icon to more than one group in said at least one group icon, wherein each segment of the plurality of different segments designates that the at least one member icon is grouped to the group icon coded with said same type identifier as said each segment of the second type identifier; and
activating the at least one lamp of the member icon being grouped to the group icon by selecting the group icon.

2. The method of claim 1, wherein said first type identifier is a first color and the second type identifier is a second color, wherein a same type identifier is the first color being same as the second color.

3. The method of claim 1, wherein said first type identifier is a first pattern and the second type identifier is a second pattern, wherein a same type identifier is the first pattern being same as the second pattern.

4. The method of claim 1, wherein the periphery of the at least one member icon surrounds an entirety of the at least one member icon.

5. The method of claim 1, wherein the periphery of the at least one member icon is present at only a base of the at least one member icon.

6. The method of claim 1, wherein the periphery of the at least one member icon is present at only a sidewall of the at least one member icon.

7. The method of claim 1, wherein the at least one member icon has an arcular perimeter.

8. The method of claim 1, wherein the at least one member icon has a multi-sided perimeter.

9. The method of claim 1, wherein the lighting characteristic is selected from the group consisting of light intensity, light color, light color temperature and combinations thereof.

10. The method of claim 1, wherein said scene linked to the group function icon comprises a dining room, a theater/entertainment room, a bathroom, a bedroom, an office, an exercise room, a garage, a hallway, an entranceway, a stairway or a combination thereof.

11. The method of claim 1, wherein said color coding the at least one group icon for the scene comprises selecting a color displayed at a periphery of the at least one group function icon.

12. The method of claim 1, wherein each at least one member icon includes a member format icon designating the light function form.

13. A system for controlling lighting comprising:
a processor coupled to a memory, the processor being configured to:

code, using a coder, at least one group icon for a scene in response to a first user instruction entered into a light control interface, the at least one group icon being coded with a first type identifier corresponding to the scene;

group, using a grouping software module, at least one member icon designating a light characteristic for the at least one group icon in response to a second user instruction entered into the light control interface, the at least one member icon having a second type identifier that is depicted on the light control interface, wherein member icon to group icon grouping is designated when the second type identifier has a same type as the first type identifier, the second type identifier is present at a periphery of the at least one member icon, wherein the second type identifier comprises a plurality of segments identifying grouping of the at least one member icon to more than one group in said at least one group icon, wherein each segment designates that the at least one member icon is grouped to the group icon coded with said same type identifier as said each segment of the second type identifier; and activate lighting, using a lighting controller, in response to a third user instruction entered into the light control interface, the third user instruction selecting at least one group icon, wherein each of said light function form of said at least one member icon being grouped to the at least one group icon selected by the third user instruction is activated.

14. The system of claim 13, wherein said first type identifier is a first color and the second type identifier is a second color, wherein a same type identifier is the first color being same as the second color.

15. The system of claim 13, wherein said first type identifier is a first pattern and the second type identifier is a second pattern, wherein a same type identifier is the first pattern being same as the second pattern.

16. The system of claim 13, wherein the lighting characteristic is selected from the group consisting of light intensity, light color, light color temperature and combinations thereof.

17. A computer readable storage medium including contents that are configured to cause a computer to perform a method for controlling lighting, the method comprising:

coding at least one group icon for a scene for lighting on a light control interface, the at least one group icon being coded with a first type identifier corresponding to the scene;

grouping at least one member icon designating a light characteristic for at least one lamp to the at least one group icon on the light control interface, the at least one member icon including a second type identifier, wherein a member icon being grouped to a group icon has a same type identifier for the second type identifier for the member icon as the first type identifier, the second type identifier is present at a periphery of the at least one member icon, wherein the second type identifier comprises a plurality of segments identifying grouping of the at least one member icon to more than one group in said at least one group icon, wherein each segment of the plurality of different segments designates that the at least one member icon is grouped to the group icon coded with said same type identifier as said each segment of the second type identifier; and activating the at least one lamp of the member icon being grouped to the group icon by selecting the group icon.

18. The computer readable storage medium as recited in claim 17, wherein said first type identifier is a first color and the second type identifier is a second color, wherein a same type identifier is the first color being same as the second color.

19. The computer readable storage medium as recited in claim 17, wherein said first type identifier is a first pattern and the second type identifier is a second pattern, wherein a same type identifier is the first pattern being same as the second pattern.

20. The computer readable storage medium as recited in claim 17, wherein the lighting characteristic is selected from the group consisting of light intensity, light color, light color temperature and combinations thereof.

* * * * *